United States Patent

Iwata et al.

[11] Patent Number: 5,982,342
[45] Date of Patent: Nov. 9, 1999

[54] THREE-DIMENSIONAL DISPLAY STATION AND METHOD FOR MAKING OBSERVERS OBSERVE 3-D IMAGES BY PROJECTING PARALLAX IMAGES TO BOTH EYES OF OBSERVERS

[75] Inventors: Satoshi Iwata; Manabu Ishimoto; Masato Nakashima; Hirokazu Aritake; Satoshi Maeda; Takahiro Matsuda; Junji Tomita, all of Kawasaki, Japan

[73] Assignee: Fujitsu Limited, Kawasaki, Japan

[21] Appl. No.: 08/775,334

[22] Filed: Dec. 31, 1996

[30] Foreign Application Priority Data

Aug. 13, 1996 [JP] Japan .................................. 8-213464

[51] Int. Cl.⁶ ...................................................... G09G 5/00
[52] U.S. Cl. .................. 345/7; 348/51; 359/462
[58] Field of Search ................... 345/7, 8, 9, 31, 345/32; 348/51, 52, 54–59, 42, 44; 359/443–461, 458, 451, 462, 466, 472, 473; 353/7, 30

[56] References Cited

U.S. PATENT DOCUMENTS 5,781,229  7/1998  Zediker et al. ............................ 348/51

FOREIGN PATENT DOCUMENTS

0707420 A1  4/1996  European Pat. Off. .

*Primary Examiner*—Amare Mengistu
*Assistant Examiner*—Vanel Frenel
*Attorney, Agent, or Firm*—Staas & Halsey LLP

[57] ABSTRACT

A parallax image generator establishes a plurality of projected regions around a display in predetermined intervals and generates a plurality of parallax images having different parallaxes due to being seen from respective points of view. In addition, pixels of the plurality of parallax images occupying the same position are gathered together in a pixel block, and are mapped to rendering memory corresponding to the display. A parallax image display unit displays mapped images in the rendering memory, projects the light from a pixel toward the projected region corresponding to each parallax image per pixel of the plurality of parallax images in each pixel block, and makes a 3-D image observed by positioning both eyes of an observer in adjacent projected regions and projecting the parallax images.

26 Claims, 39 Drawing Sheets

FIG. 16

| PARALLAX IMAGE NO. | ADDRESS (s, t) |
|---|---|
| 1 | (1, 2) |
| 2 | (1, 1) |
| 3 | (2, 2) |
| 4 | (2, 1) |
| 5 | (3, 1) |
| 6 | (4, 1) |
| 7 | (2, 3) |
| 8 | (4, 2) |
| 9 | (4, 3) |
| 10 | (4, 4) |
| 11 | (3, 4) |
| 12 | (3, 3) |
| 13 | (2, 4) |
| 14 | (1, 4) |
| 15 | (1, 3) |
| 16 | (2, 3) |

FIG. 18

| PARALLAX IMAGE NO. | ADDRESS (s, t) |
|---|---|
| 1 | (1, 1) |
| 2 | (2, 1) |
| 3 | (3, 1) |
| 4 | (4, 1) |
| 5 | (1, 2) |
| 6 | (2, 2) |
| 7 | (3, 2) |
| 8 | (4, 2) |
| 9 | (1, 3) |
| 10 | (2, 3) |
| 11 | (3, 3) |
| 12 | (4, 3) |
| 13 | (1, 4) |
| 14 | (2, 4) |
| 15 | (3, 4) |
| 16 | (4, 4) |

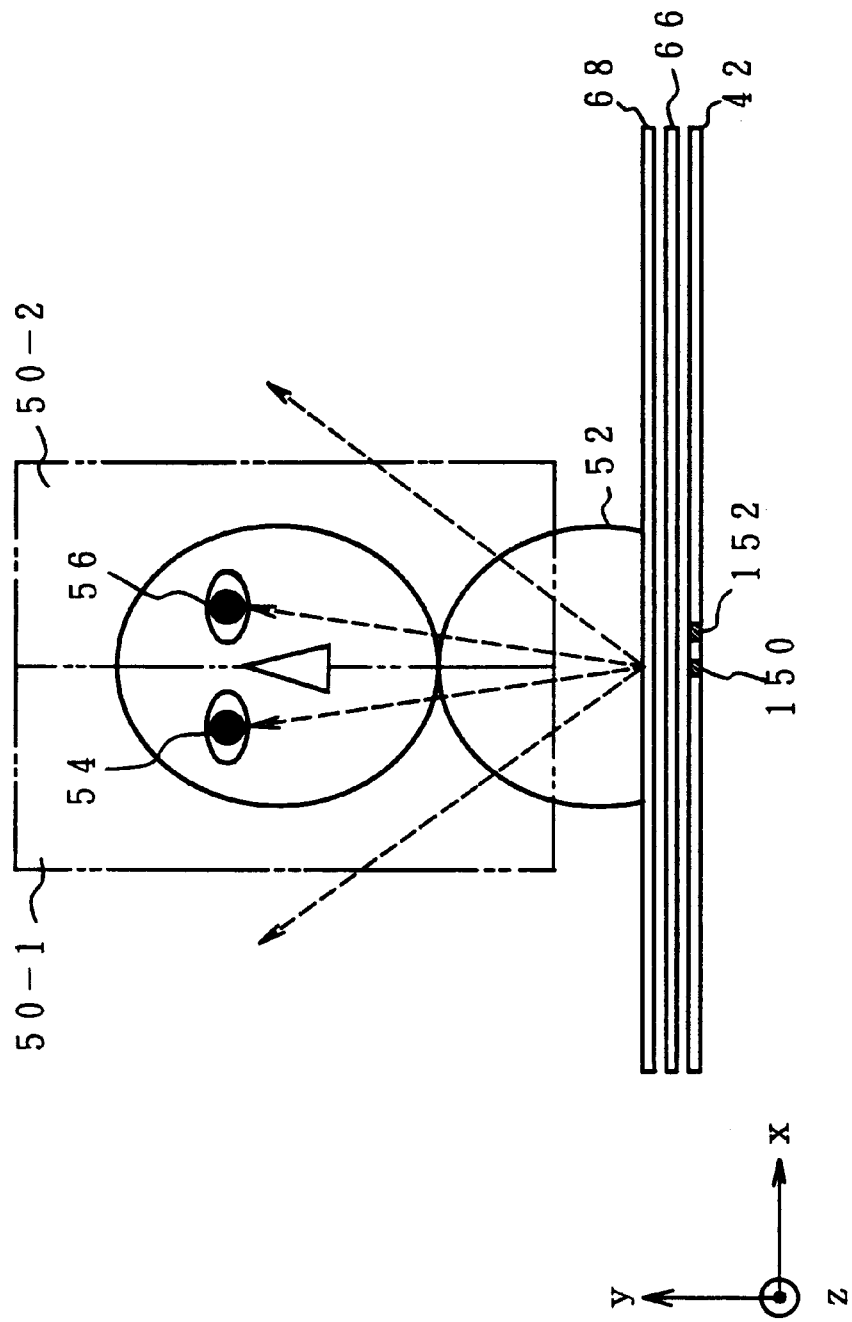

t = t1 t2 = t1 + ΔT t3 = t1 + 2ΔT t4 = t1 + 3ΔT

THREE-DIMENSIONAL DISPLAY STATION AND METHOD FOR MAKING OBSERVERS OBSERVE 3-D IMAGES BY PROJECTING PARALLAX IMAGES TO BOTH EYES OF OBSERVERS

BACKGROUND OF THE INVENTION

1. Field of the Invention

The present invention relates to a three-dimensional display station and method for enabling an observer to observe 3-D images by projecting parallax images to both eyes of the observer. The present invention particularly relates to a three-dimensional (hereinafter, this is referred to as "3-D") display station and method for enabling observers to observe 3-D images around a display screen horizontally arranged.

2. Description of the Related Art

Recently, owing to progress in liquid-crystal display ("LCD") technology, CRT technology, and the like, high resolution display stations and high density display stations have been developed. On the other hand, owing to faster CPUs, generation speed of images has also speeded up. Due to this progress, it becomes possible rapidly to generate images using parallaxes of both eyes, left and right eyes, as well as flat images. For this reason, it becomes possible to display images in three dimensions, and to grasp objects in a virtual space without using real ones. These 3-D displays can be widely applied to reference of the same objects by many persons in teleconference systems, arcade games, 3-D display of computer-aided design ("CAD") information in the CAD fields, transportation control of airplanes and the like, simulators for experiments and the like.

Using known technologies presently developed into 3-D TVs, there are TVs using eye glasses, TVs using parallax barriers, stereogram-type TVs, and the like. FIG. 1 shows a known 3-D TV using a lenticular lens. By vertically arranging a display unit 300 and defining the region opposing to a display screen of the display unit 300 as a 3-D visible range 302, an observer 304 can observe a 3-D image within this range by seeing different images having parallax between left and right eyes. FIG. 2 is a top view of FIG. 1. The 3-D visible range is a range of width determined by the pupillary distance 312 of the observer 304. The display unit 300 is composed of an LCD panel 306, a shutter 308, and a lenticular lens 310 for projection. On the LCD panel 306, parallax images for a right eye and parallax images for a left eye are displayed alternately at a frame period of, for example, ¹⁄₆₀ sec at positions different by a pixel. The parallax images for a right eye on the LCD panel 306 are projected to the direction of the right eye of the observer 304, as shown by full lines, through openings of a slit 308 corresponding to respective pixels. In addition, the parallax images for a left eye, having positions different from the parallax images for a right eye respectively by a pixel, are projected in the direction of the left eye of the observer 304, as shown by broken lines, through openings of a slit 308 corresponding to respective pixels. Consequently, the observer 304 recognizes the 3-D images by observing images having parallax between left and right eyes. Thus, known 3-D display stations realize 3-D perception in the front direction, relative to an axis normal to the display screen, by selecting images more necessary for human eyes among display light of images projected from the display screen to its front and using parallax of the images between the right and left eyes.

However, in such known 3-D display stations, the display unit 300 should be installed facing the eyes of the observer 304, and the range where 3-D images can be recognized is limited to the 3-D visible range 302 that is in front of the display unit 300. Therefore, a problem arises when many persons want to observe the same objects in teleconference systems, arcade games, 3-D display of CAD information in the CAD fields, transportation control of airplanes and the like, simulators for experiments and the like, because such observation by many at once cannot be performed. In addition, if many persons observe an image, in a usual display station, a display unit may be horizontally arranged. However, if the display unit 300 of the known 3-D display station are horizontally arranged, a 3-D visible range 302 is located on the display unit 300, and hence, it is irrational that observers exist in such positions.

SUMMARY OF THE INVENTION

According to the present invention, without being limited by an installation state of a display unit, it is possible to provide a 3-D display station and method that make 3-D images visible from necessary observational positions even if many persons are there.

The present invention is a 3-D display station for making 3-D images observed by projecting parallax images to both eyes, and comprises a parallax image generator and a parallax image display unit. The parallax image generator establishes a plurality of projected regions at predetermined intervals around a display screen where an object will be displayed, and generates a plurality of parallax images having different parallaxes due to being seen from respective points of view established in respective projected regions. Moreover, the unit puts pixels of a plurality of parallax images at the same position into a pixel block, and maps it on rendering memory corresponding to the display screen. The parallax image display unit displays mapped images, stored in the rendering memory, on the display. Further, the unit projects the light from a pixel to the direction of the projected region, corresponding to each parallax image, around the display screen every pixel of a plurality of parallax images constituting each displayed pixel block. Furthermore, the unit makes the 3-D images observed by positioning both eyes of the observer in different projected regions and projecting the parallax images.

In such a 3-D display station according to the present invention, many projected regions of parallax images are formed around the display unit, an observer recognizes a 3-D image anywhere by observing two images from positions oblique to the display screen, the two images which are projected to the projected regions different for left and right eyes, that is, have different parallaxes. Therefore, it is possible for many persons to observe the same 3-D image, and for a person to perform three-dimensional observation of "what it is" by moving to different positions.

Here, each interval of projected regions for generating and projecting parallax images is set to be not more than the space of human eyes. In addition, the parallax image generator generates parallax images of the object that are located in an internal space of a solid established in the projected regions, for example, formed by regarding points of view and the display surfaces as vertexes and a base respectively. The parallax image generator projects on the display each sample point on the object observed from points of view in the projected regions, and generates parallax images as sets of projected points. For example, this generator adds attenuated values of light between sample points and projected points to the intensity of the object at the sample points on the object as pixel data at the projected points, and generates this intensity as the pixel data of parallax images. In addition, the pixel data at projected points may be defined as textured values at the sample points on the object. The parallax image generator establishes a plurality of projected regions continuing around the display as establishment of the projected regions, and generates a plurality of parallax images having different parallaxes due to being seen from respective points of view established in respective projected regions. In this case, the parallax image display unit projects light from corresponding pixels of the parallax images toward the projected regions continuing around the display, and projects parallax images continuously varying around the display. As a form of projected regions, the parallax image generator establishes around the display a plurality of projected regions that are divided into a plurality of groups and are continuous, and generates a plurality of parallax images having different parallaxes due to being seen from respective points of view established in respective projected regions per group. In this case, the parallax image display unit projects the light from pixels of parallax images toward the corresponding projected regions, which are divided into a plurality of groups and are continuous, around the display. In addition, as another form of projected regions, the parallax image generator unit combines two different projected regions as a pair, establishes a plurality of pairs around a display, and generates pairs of parallax images, each pair of parallax images being the same as those having different parallaxes due to being seen from respective points of view established in any pair of projected regions. In this case, the parallax image display unit projects light from pixels of the parallax images to each corresponding pair among pairs of different projected regions established around the display screen, and projects the same pair of parallax images to pairs of projected region, which are divided into a plurality of groups and are continuous, around the display screen. The parallax image display unit can enlarge and shrink displayed 3-D images by changing a count of pixel blocks which are mapped from a pixel of a parallax images on rendering memory. Here, regarding enlargement, an image can be enlarged two or three times by increasing the count of pixel blocks, which are mapped from a pixel, by two or three respectively. Furthermore, if an image is shrunk after enlargement, it can be shrunk by a factor of 2 or 3 by decreasing the count of pixel blocks, which are mapped from a pixel, by one every two blocks or by two every three respectively. The parallax image generator can rotate a displayed 3-D image by sequentially shifting each pixel position of a plurality of parallax images in each pixel block saved on the rendering memory in arrayed sequence of pixel positions corresponding to the continuous projected regions.

In order to display the same parallax images on a plurality of projected regions, the parallax image generator combines into a pair two pixels corresponding to different projected regions and being in each pixel block on the rendering memory, maps pixels of a parallax image generated by establishing a projected region corresponding to a pixel of each pair as a point of view, maps pixels of another parallax image generated by establishing another projected region corresponding to another pixel of each pair as a point of view, and makes observers observe the same 3-D image in each of pairs of projected regions. For mapping a plurality of parallax images to the rendering memory, the parallax image generator obtains a pixel address (I, J) in the rendering memory for a pixel address (i, j) in any parallax image by performing coordinate transformation using following formulas:

$I = s + S(i-1)$ $J = t + T(j-1)$ where, (i, j) is each pixel address, (s, t) is a pixel address of arbitrary parallax count in a pixel block, S is pixel block size in a horizontal direction ($1 \leq s \leq S$), T is pixel block size in a vertical direction ($1 \leq t \leq T$), and (I, J) is a pixel address in the rendering memory for mapping a plurality of parallax images. After that, the unit maps pixel data. This coordinate transformation is the processing to transform the pixel address (i, j) into a position (I, J), which is an arithmetic progression in two dimensions by a difference (S, T), so as to allocate a parallax image having (i×j) pixels to fixed positions in a pixel block having (s×t) pixels. Relation among a parallax image, rendering memory, and a pixel block is as follows. The pixel size of the rendering memory is (M×N×n) which is equal to the multiplication of the pixel size of the parallax image, (M×N) by the projected region count (parallax count) n, where n is the count of projected regions established around the display, (M×N) is the pixel count of the parallax image which is equal to the multiplication of a horizontal pixel size M by a vertical pixel size N. Furthermore, let (s×t) be the pixel count of the pixel block which is equal to the multiplication of a horizontal pixel count s by a vertical connection count t, and then, the pixel count of the pixel block, (s×t) becomes equal to the projected region count n. The parallax image generator generates parallax images by performing geometrical calculation from 3-D object information. In addition, the parallax image generator may generate the parallax images from the images obtained by shooting an object with an image pickup equipment.

A parallax image display unit comprises a display panel for displaying mapped images in memory on a display, and a projection panel for projecting light from a pixel toward a projected region, corresponding to respective parallax images, around the display per pixel of a plurality of parallax images constituting each pixel block displayed on the display panel. The display panel and projection panel are horizontally installed, and a projected range is 0–90° that is from the surface of the display panel to the normal to the display panel. The display screen of the parallax image display unit may have an optional shape such as a rectangular plane shape, or a plane shape with round corners like a circle or an ellipse. The projection panel comprises a lens array where a lens is located every display pixel of the display panel, and a deflecting array where a refracting element or a diffraction element for deflecting incident light from each lens of the lens array toward the corresponding projected region. Another form of a parallax image display unit according to the present invention has the structure comprising a mirror panel where a plurality of mirror segments corresponding to all pixels of mapped image in the rendering memory are located on the display and each mirror segment of mirror blocks corresponding to the pixel blocks are located so that the mirror segments may reflect incident light from predetermined incident points to the corresponding projected regions established around the display, a direction controller for scanning the incident light to the mirror segments of the mirror panel in predetermined order and reflecting the light toward the projected region determined with arrangement of each mirror segment, and a light modulator for changing the intensity of light entering into the direction controller according to the pixel data in the rendering memory. Still another form of the present invention is time-sharing projection display. In this case, the parallax image generator establishes a plurality of projected regions in predetermined intervals around the display for displaying an object, generates a plurality of parallax images having different parallaxes due to being seen from respective points of view established in respective projected regions, and maps the plurality of parallax images on a plurality of rendering memory where the plurality of parallax images are arrayed on a time base. The parallax image display unit displays the parallax images in the rendering memory at constant periods on the display according to order on the time base, controls the projected direction so that the light from each pixel may go to the plurality of projected regions established around the display in turn every image display, and makes a 3-D image observed by having the different parallax images seen to both eyes in time-sharing. The parallax image display unit for this purpose comprises a display panel for displaying the parallax images saved in the rendering memory on the display screen at constant periods in time-sharing, and a direction control array for controlling light directions so that this array may receive the light from each lens of the lens array each time the parallax image is displayed on the display panel, and the light may go to the plurality of projected regions in turn in time-sharing.

In addition, the present invention is a three-dimensional display method for making 3-D images observed by projecting parallax images to both eyes, and comprises the following processes.

Parallax Image Generation Process:

A plurality of projected regions are established around a display in predetermined intervals, a plurality of parallax images are generated, the parallax images having different parallaxes due to being seen from respective points of view established in respective projected regions, and pixels at the same position of the plurality of parallax images are combined into one pixel block and mapped on memory corresponding to the display screen.

Projection Process:

The mapped image on the memory is displayed on the display, light from a pixel is projected toward the projected region, corresponding to each parallax image, around the display screen every pixel of the plurality of parallax images constituting each displayed pixel block, and observers is made to observe the 3-D image by positioning both eyes of observers in different projected regions and projecting the parallax images.

The time-shared three-dimensional display method according to the present invention has the following processes.

Parallax Image Generation Process:

A plurality of projected regions are established around a display in predetermined intervals, a plurality of parallax images are generated, the parallax images having different parallaxes due to being seen from respective points of view established in respective projected regions, and the plurality of parallax images are mapped on rendering memory so that the images may be arrayed on a time base.

Parallax Image Display Process:

The plurality of parallax images on the rendering memory are displayed on the display at constant intervals according to the order on the time base, projected directions are controlled so that light from each pixel may go to the plurality of projected regions established around the display in turn every image display, and observers are made to observe the 3-D image by making both eyes of observers see the parallax images in time-sharing.

The above and other objects, and advantages of the present invention will become more apparent from the following detailed description with reference to the drawings.

BRIEF DESCRIPTION OF THE DRAWINGS

FIG. 16 is an explanatory drawing of an address conversion table for parallax image numbers based on the allocation of the pixel blocks in FIG. 15;

FIG. 18 is an explanatory drawing of an address conversion table for parallax image numbers based on the allocation of the pixel blocks in FIG. 17;

FIG. 22 is an explanatory drawing of a 3-D display function by projection of parallax images according to the present invention;

DETAILED DESCRIPTION OF THE PREFERRED EMBODIMENTS

Figure 1:
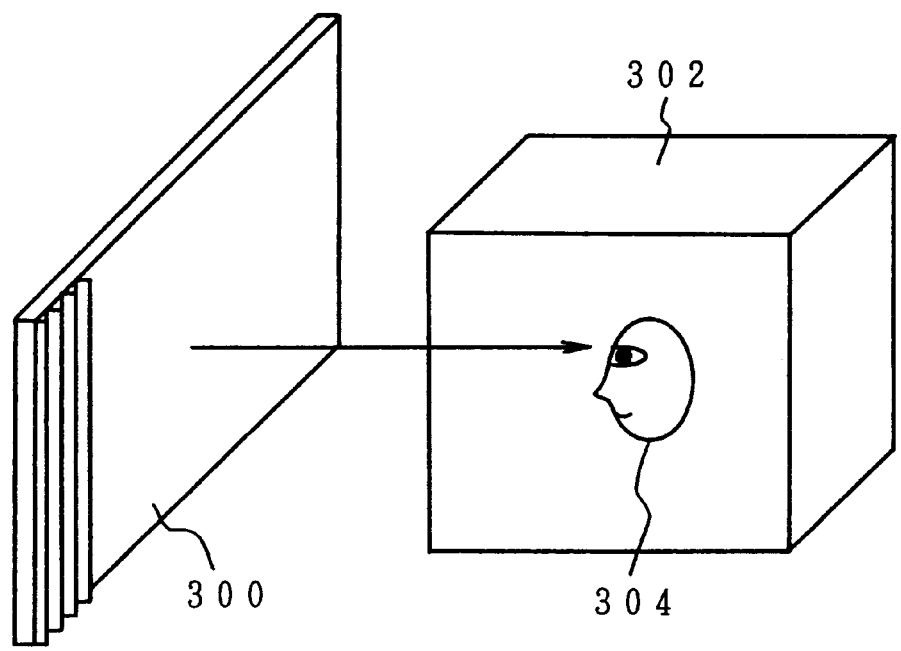
FIG. 1 is an explanatory drawing of a conventional station using a parallax barrier.
Figure 2:
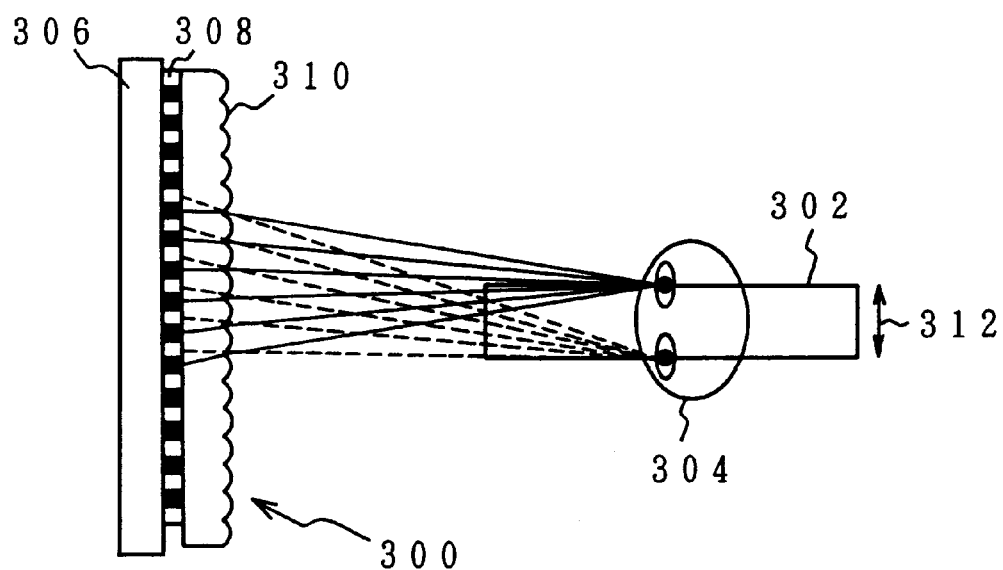
FIG. 2 is an explanatory top view of a conventional station in FIG. 1.
Figure 3:
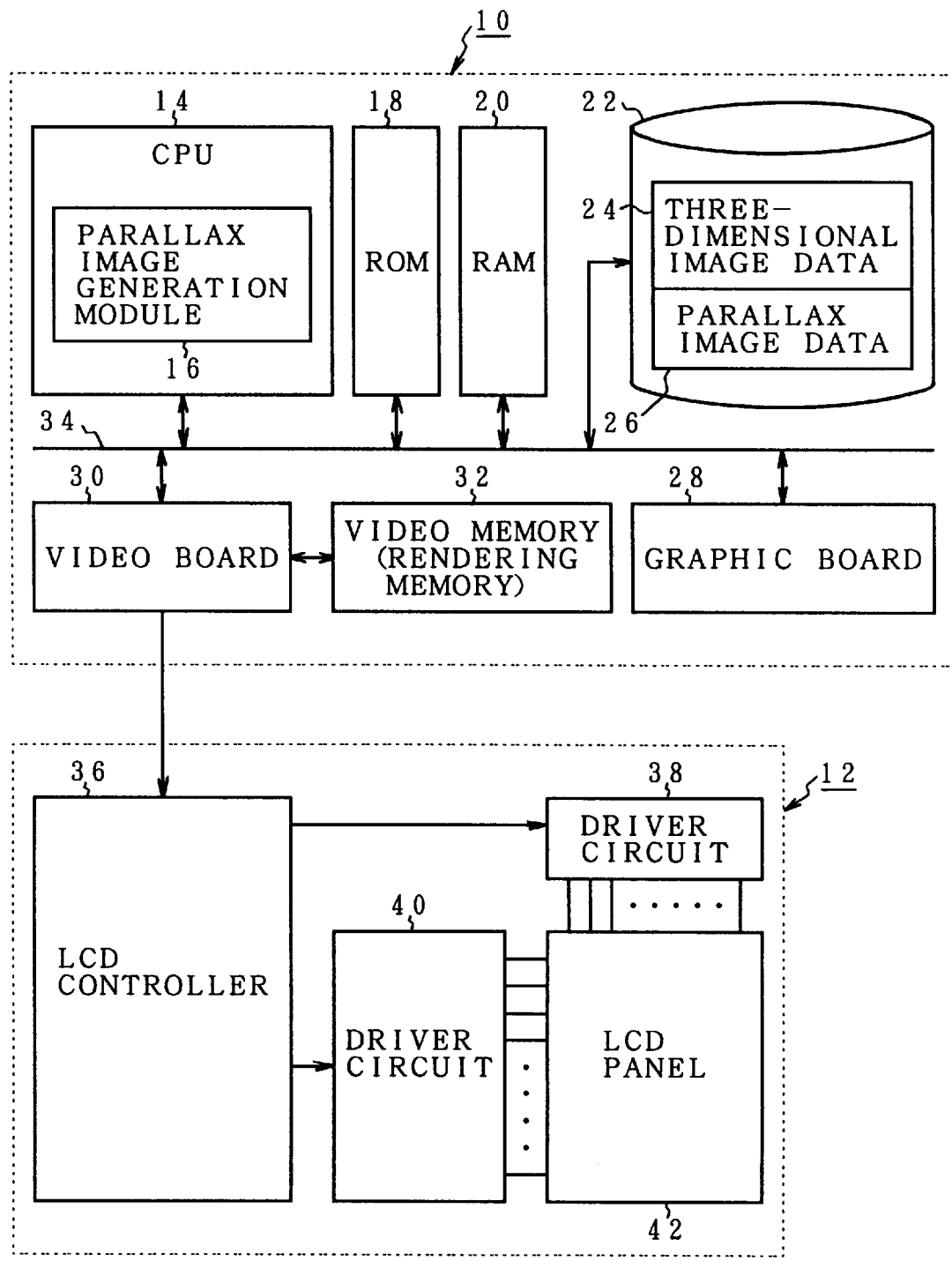
FIG. 3 is a block diagram showing construction of a station according to the present invention.

CONSTRUCTION OF STATION:

FIG. 3 is a block diagram showing construction of a station according to the present invention. A three-dimensional display station according to the present invention comprises a parallax image generator 10 and a parallax image display unit 12. The parallax image generator 10 is provided with a CPU 14, which executes a parallax image generation module 16 prepared as an application program. The CPU 14 is connected via bus 34 to a ROM 18, a RAM 20, a system disk file 22, a graphic board 28, a video board 30, and video memory 32 functioning as rendering memory. In the system disk file 22, 3-D image data 24 and parallax image data 26 generated from the 3-D image data 24 are saved. The parallax image display unit 12 comprises an LCD controller 36, driver circuits 38 and 40, and an LCD panel 42. As an LCD panel 42, a TFT LCD panel that is commonly used may be used, but a pixel count of the TFT LCD panel is about 1280×1024 at the maximum, and hence, the pixel count is insufficient. In the present invention, it is desirable to use a panel having a large number of pixels and high resolution, for example, a phase transition type of LCD panel. This is because the present invention requires the pixel count to make it possible substantially to display a plurality of parallax images on a LCD panel 42. The phase transition type of LCD panel has construction more simple in matrix driving than that of an active-matrix type of LCD panel such as a TFT LCD panel. Therefore, it is adequate for realization of the large pixel count and high resolution, and presently, panels having 2500×3500 pixels are available. On, for example, a 3-D object having the 3-D image data 24 saved in the system disk file 22, the parallax image generation module 16 that is executed by the CPU 14 of the parallax image generator 10 generates parallax images corresponding to a plurality of projected regions established around the display screen of the LCD panel 42 in the parallax image display unit 12. Then, the module 16 saves these images in the system disk file 22 as parallax image data 26. When the module 16 can generate parallax images for a plurality of projected regions as the parallax image data 26, the parallax image generation module 16 maps the image data of a plurality of parallax images to the video memory 32 equivalent to frame memory of the LCD panel 42 in the parallax image display unit 12. The image data of the plurality of parallax images mapped in the video memory 32 is transferred to the LCD controller 36 of the parallax image display unit 12 by the video board 30. Then, image information is displayed according to the presence of voltages applied to LCDs located at cross-points of driver lines arranged in a matrix, by line driving of the LCD panel by the driver circuit 40 and driving every line of display pixels by the driver circuit 38. The image information of the plurality of parallax images displayed on the LCD panel 42 is projected per parallax image to each of the plurality of projected regions established around the display by the projection panel. These regions are located on the LCD panel and will be described later. Consequently, corresponding parallax images can be recognized in respective projected regions.

Figure 4:
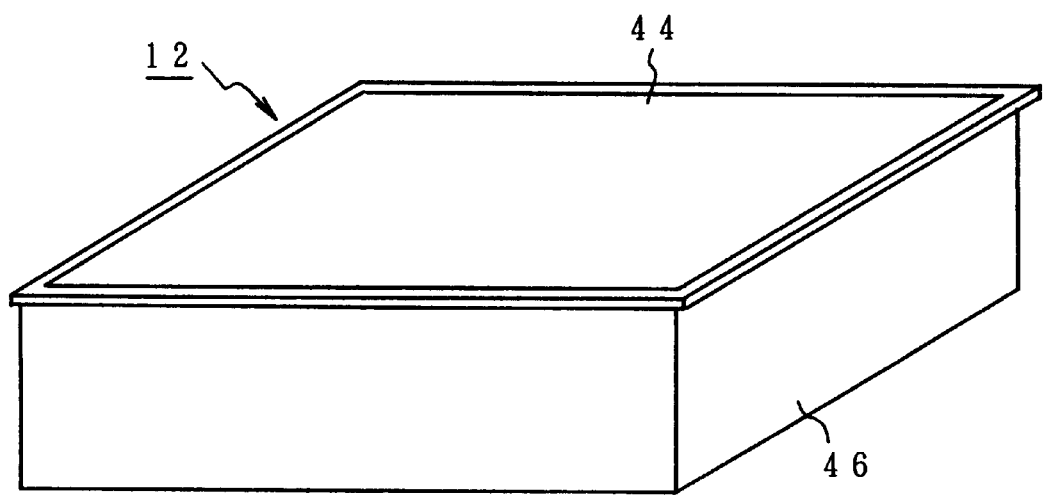
FIG. 4 is an explanatory drawing of a display unit according to the present invention, the display unit being horizontally arranged.

FIG. 4 is an appearance of the parallax image display unit 12 in FIG. 3. The parallax image display unit 12 comprises a display screen 44 in the upper portion of a frame 46. The display 44 is kept horizontal by installing the frame 46 on a floor and the like.

Figure 5:
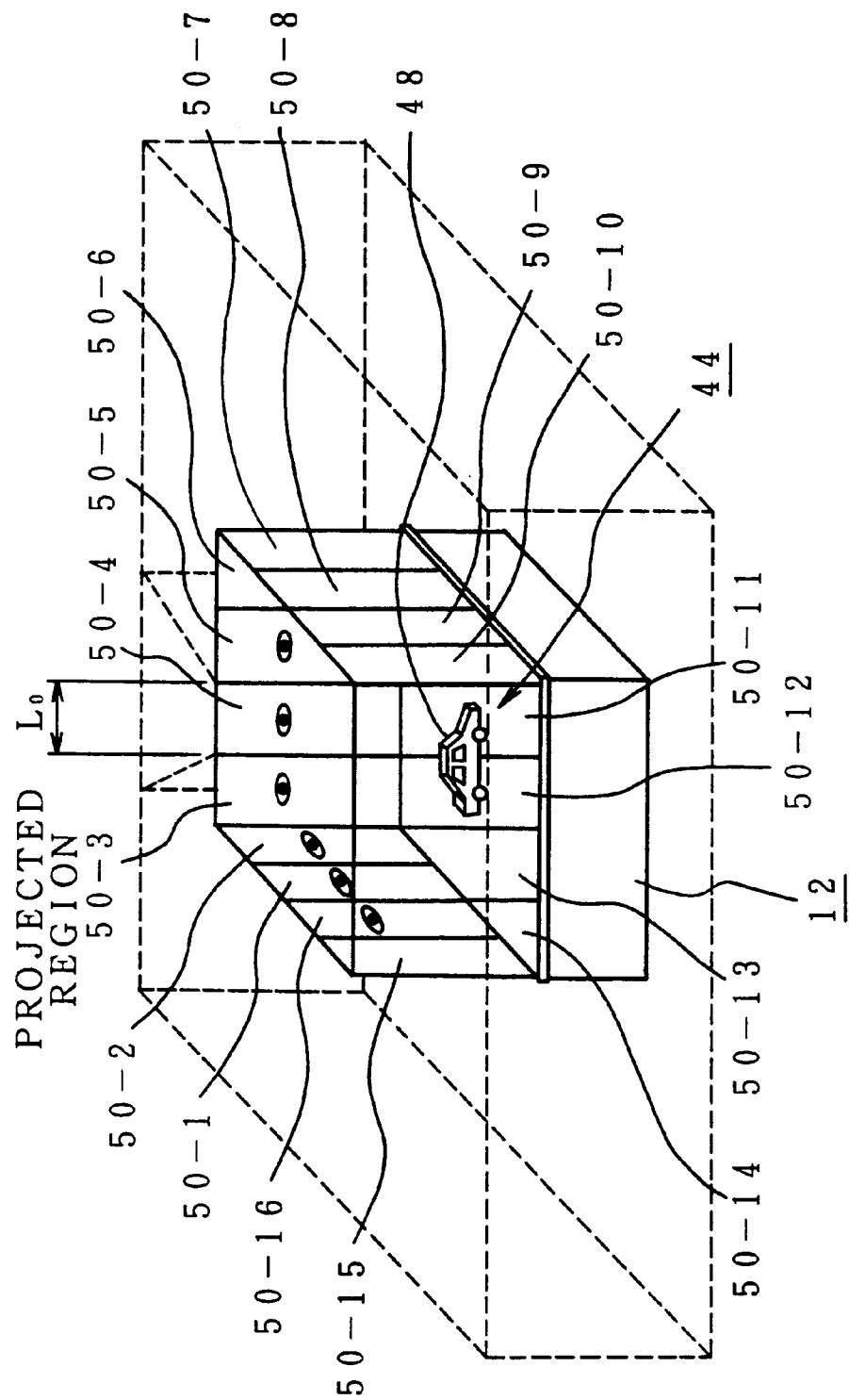
FIG. 5 is an explanatory drawing of projected regions according to the present invention.

PROJECTION OF PARALLAX IMAGES:

FIG. 5 is an explanatory drawing of projected regions established around the display 44 of the parallax image display unit 12 in FIG. 4. In this embodied form, projected regions 50-1 to 50-16 are established. The projected regions are obtained by dividing each side of the display 44 into, for example, four regions, and hence, total 16 regions around the display 44 of the parallax image display unit 12. The projected regions 50-1 to 50-16 have minimum widths at perimeter portions of the display 44, widen toward the outside of the display 44, and are block-shaped regions established within a predetermined height from the display 44. The parallax image display unit 12 projects the same images as those seen from predetermined points of view established in each projected regions 50-1 to 50-16, thereby virtually placing an object 48 on the display 44. According to this establishment of projected regions 50-1 to 50-16, observers recognize the 3-D image at any positions around the display 44 by observing at the same time two adjacent parallax images different for right and left eyes. For this reason, each width of the projected regions 50-1 to 50-16 established around the display 44 is set to be not more than a space between both eyes of each observer. The space between these projected regions 50-1 to 50-16, for example, may be set to be in the range of 32.5–97.5 mm. The interval between the human eyes is generally known as a value within a range of 32.5–97.5 mm.

Figure 6:
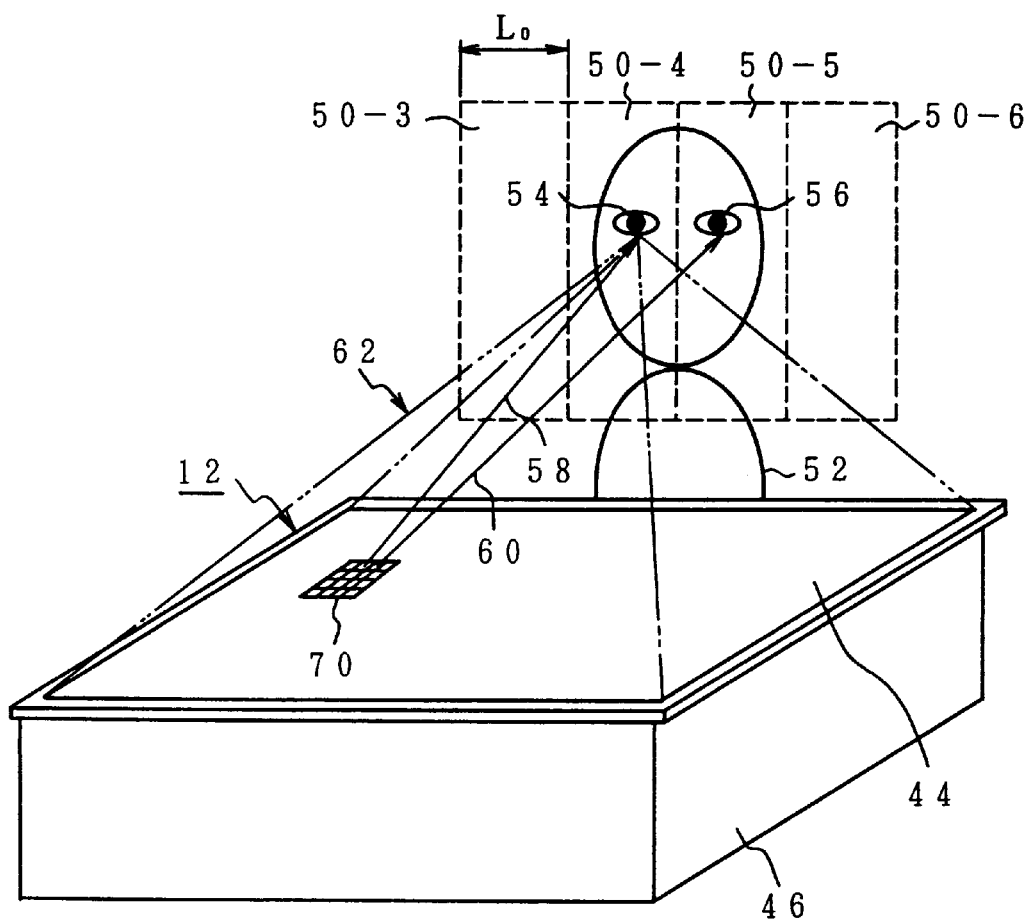
FIG. 6 is an explanatory drawing of a pixel block of a display and points of view in projected regions according to the present invention.
Figure 7:
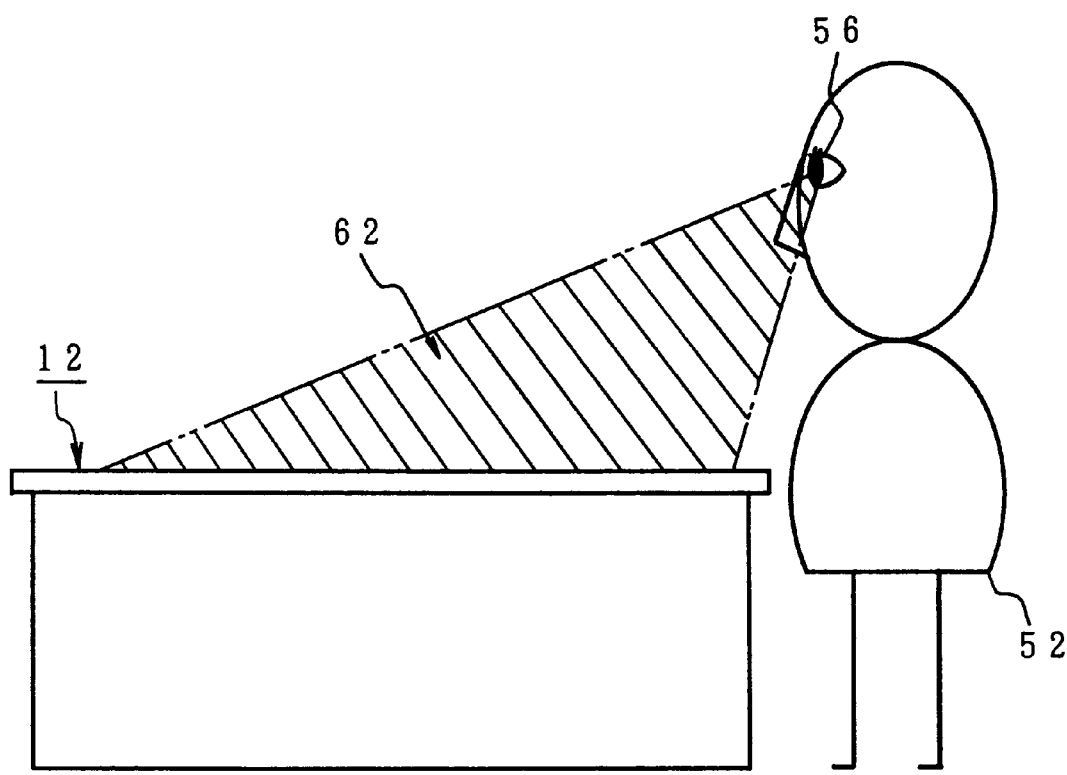
FIG. 7 is a side view of FIG. 6.

FIG. 6 shows the relation between display and projection of parallax images from the display 44 regarding four projected regions 50-3 to 50-6 in FIG. 5. The display 44 is divided into displayed units of a pixel block 70. The pixel block 70 comprises 16 pixels displaying the same position of 16 kinds of parallax images corresponding to the projected regions 50-1 to 50-16. Concretely, it is composed of four horizontal pixels×four vertical pixels, that is, 16 pixels. To each of 16 pixels constituting the pixel block 70, one pixel at the corresponding position in 16 parallax images, generated by looking from the points of view established in the projected regions 50-1 to 50-16, is allocated. Therefore, the light from each of 16 pixels constituting the pixel block 70 is projected to 16 respective projected regions 50-1 to 50-16 established, as shown in FIG. 5, around the display 44, using a projection panel which will be described later. In FIG. 6, projected directions 58 and 60, from two pixels corresponding to the projected regions 50-4 and 50-5 included in the pixel block 70, are exemplified. Thus, the parallax images of the object, which is made to be virtually located on the display 44, are generated by setting each position of a right eye 54 and a left eye 56 as a point of view for an observer 52 for whom the center of his/her eyes corresponds to the boundary position of the adjacent projected regions 50-4 and 50-5. For example, the light from a pixel corresponding to the pixel block 70 for a parallax image obtained by setting the right eye 54 as a point of view is projected by the projection panel to the right eye 54 of the observer 52 as shown by an arrow 58. Similarly, the light from a pixel corresponding to the pixel block 70 for a parallax image obtained by setting the left eye 56 as a point of view is projected by the projected panel to the left eye 56 of the observer 52 as shown by an arrow 60. The pixel blocks 70 are arrayed over the entire surface of the display 44. The light from all pixels of the parallax images, generated by looking from respective points of view of the projected regions 54-4 and 54-5, are projected to respectively corresponding projected regions 54-4 and 54-5. Consequently, the right eye 54 can visually recognize a parallax image corresponding to its position, and similarly, the left eye 56 can visually recognize a parallax image corresponding to its position. Therefore, the observer 52 can visually recognize the displayed images on the display 44 as a 3-D image. The virtual 3-D object is obtained by setting the right eye 54 of the observer 52 as a point of view and is projected to the projected region 50-4. This virtual object can be visually recognized as a 3-D image from parallax images generated from an object existing inside a region 62 having the shape of a quadrangular prism. This prism is composed of a vertex, (the right eye 54) which becomes a point of view, and a base, the display 44. This space, fixing the boundary for generation of the parallax image, is called a parallax image generation space 62. FIG. 7 is a side view of FIG. 6, and shows the 3-D image generation space 62 in relation to the display screen, in the case of setting the left eye 56 as a point of view.

Figure 8:
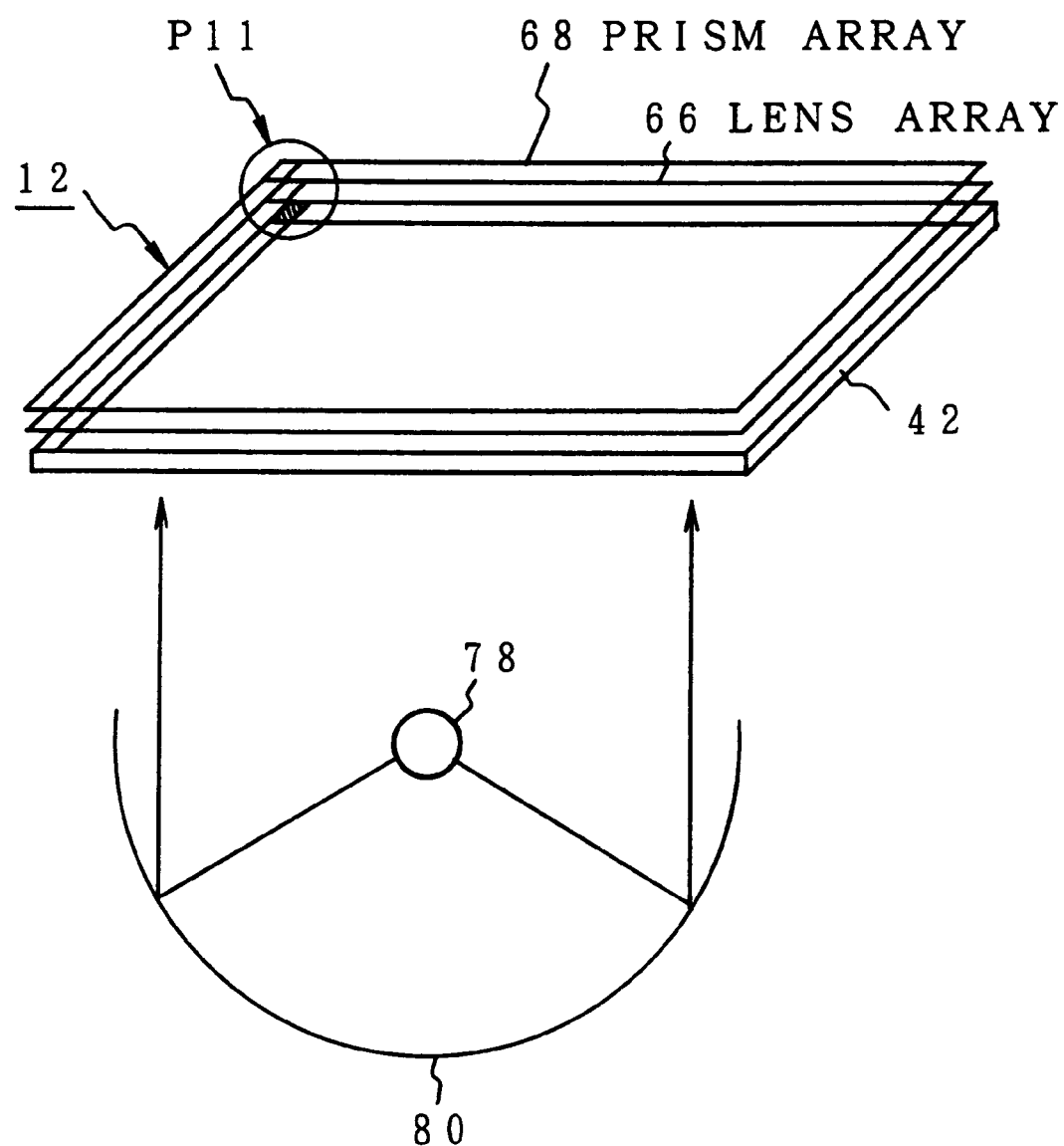
FIG. 8 is an explanatory drawing of panel construction of a display unit according to the present invention.

FIG. 8 shows an embodied form of panel construction constituting the display 44 in the parallax image display unit 12 in FIG. 4. The panel construction according to the present invention comprises three panels such as, from the bottom, the LCD panel 42, a lens array 66 and a prism array 68. In the lower part of the LCD panel 42 is installed a light source 78, such as a xenon lamp. A reflector 80 for reflecting the light from the light source 78 and converting it to parallel rays is also installed in the lower part. Hence, the parallel rays vertical to the surface of the LCD panel 42 are entered from the lower part of the LCD panel 42.

Figure 9:
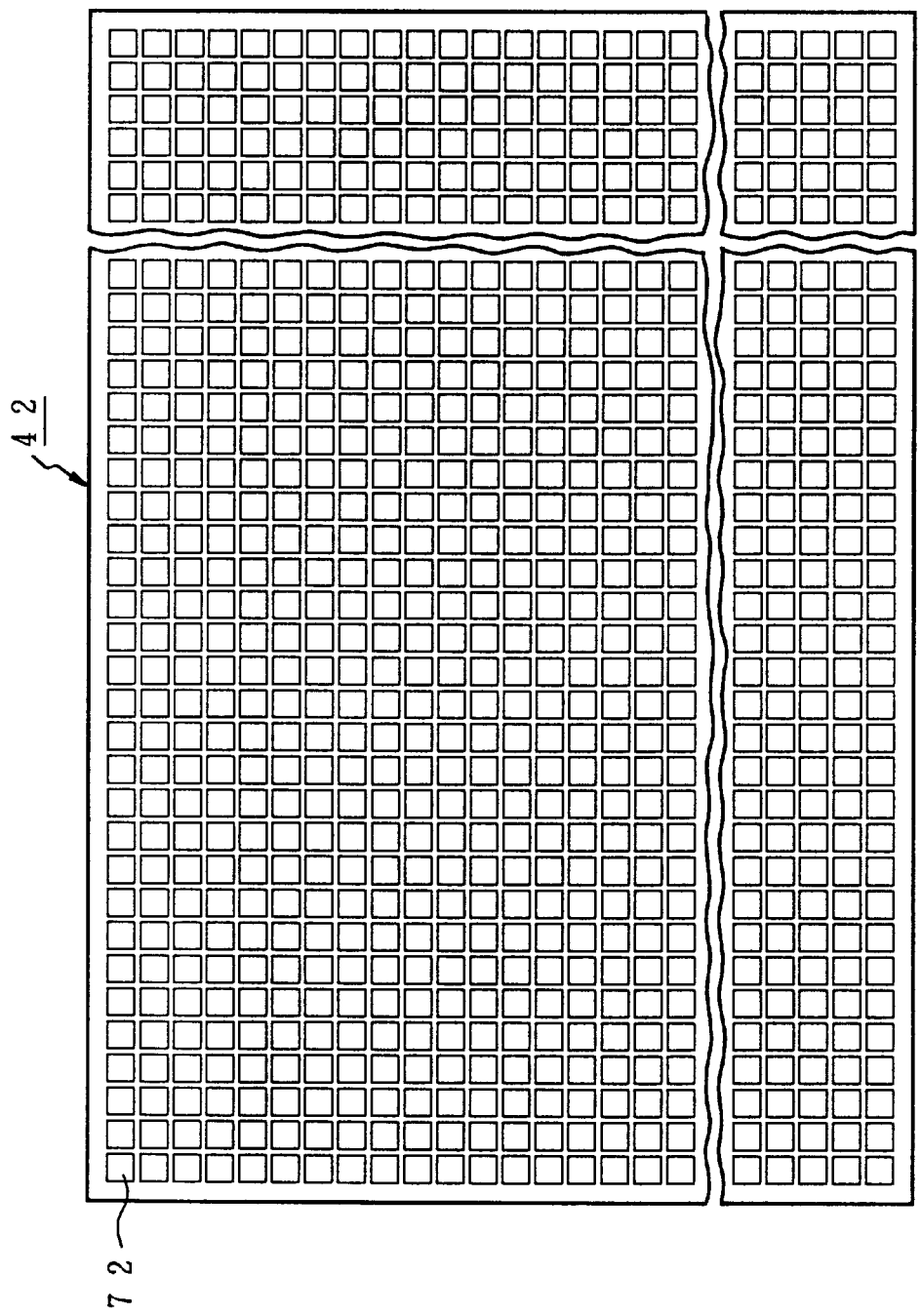
FIG. 9 is an explanatory drawing of an LCD panel in FIG. 8.

FIG. 9 shows the LCD panel 42 taken from FIG. 8. A large number of liquid-crystal cells are arrayed two-dimensionally on the LCD panel 42. Hence in the following description, each liquid-crystal cell will be described as a pixel 72.

Figure 10:
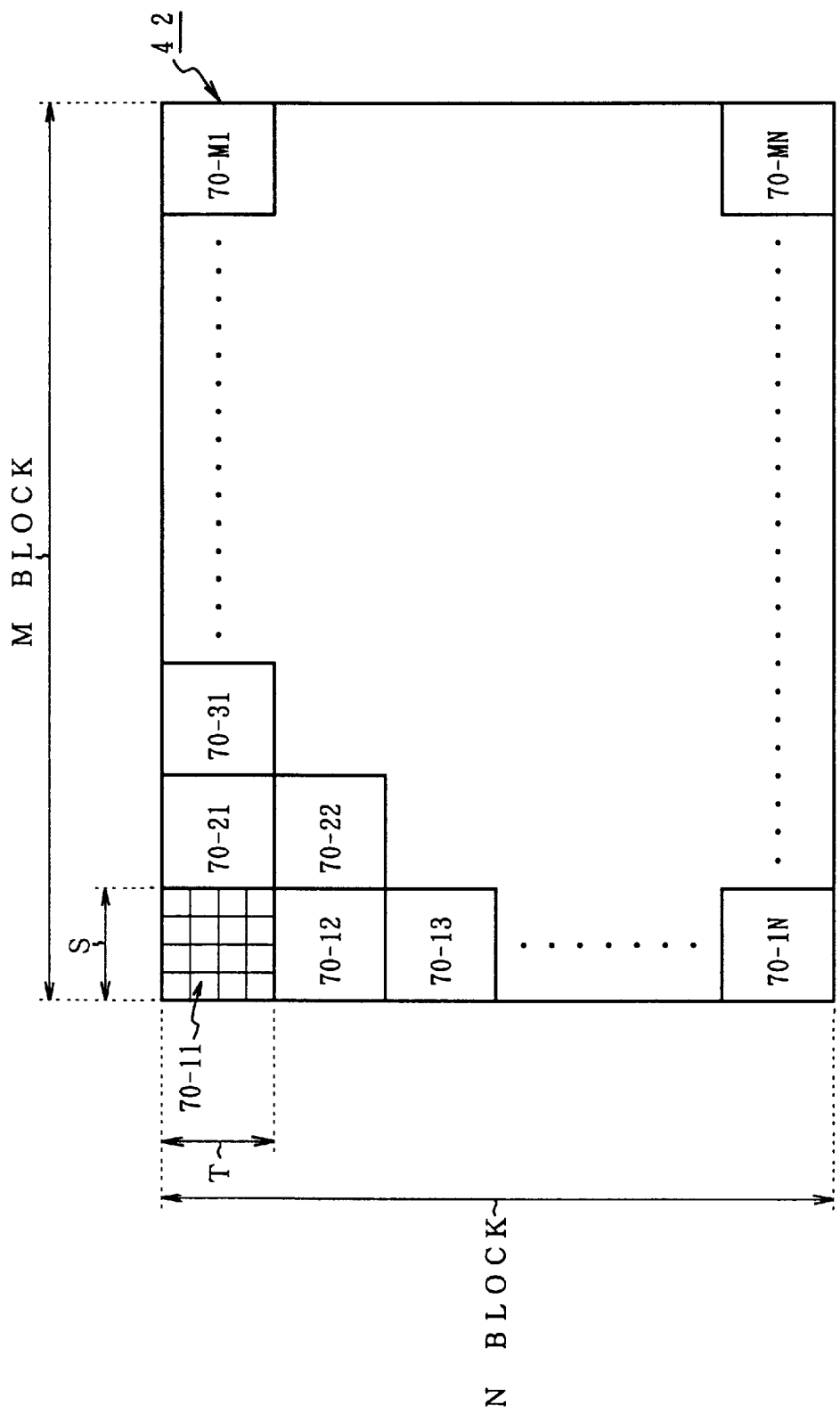
FIG. 10 is an explanatory drawing of pixel blocks in the LCD panel.

FIG. 10 is an explanatory drawing showing the set states of pixel blocks having the pixel count corresponding to the projected region count in the LCD panel 42. The display pixels of the LCD panel 42 are divided into (M×N) blocks composed of M horizontal blocks by N vertical blocks. Thus, assuming that the top left corner is the origin, the pixel blocks 70-11 to 70-MN are allocated. The pixel blocks 70-11 to 70-MN, for example, as shown using the pixel block 70-11 as a representative, are composed of sets of 16 pixels, 4 horizontal pixels (s=4) by 4 vertical pixels (t=4). Here, let n be the projected region count. The pixel count of one pixel block is equal to the projected region count, n=16. In addition, for easier block arrangement, one block is composed of 16 pixels, 4 horizontal pixels (s=4)×4 vertical pixels (t=4). This pixel count of a pixel block can be optionally determined according to the projected region count n. Therefore, pixel construction is optional besides 4×4 pixels, that is, 16 pixels such as: 2×2 pixels, 4 pixels; 3×3 pixels, 9 pixels; and 5×5 pixels, 25 pixels. Furthermore, the total number of pixels of the LCD panel 42 is the product of multiplication, the pixel count of a pixel block (s×t pixels) by the product of the horizontal block count M and the vertical block count N. According to another viewpoint, assume that the pixel count of one parallax image is the product of a horizontal pixel count M and a vertical pixel count N. In such a case it is possible to represent all pixels of the LCD panel 42 as M×N×n pixels, the product of the pixel count of one parallax image and the projected region count n.

Figure 11:
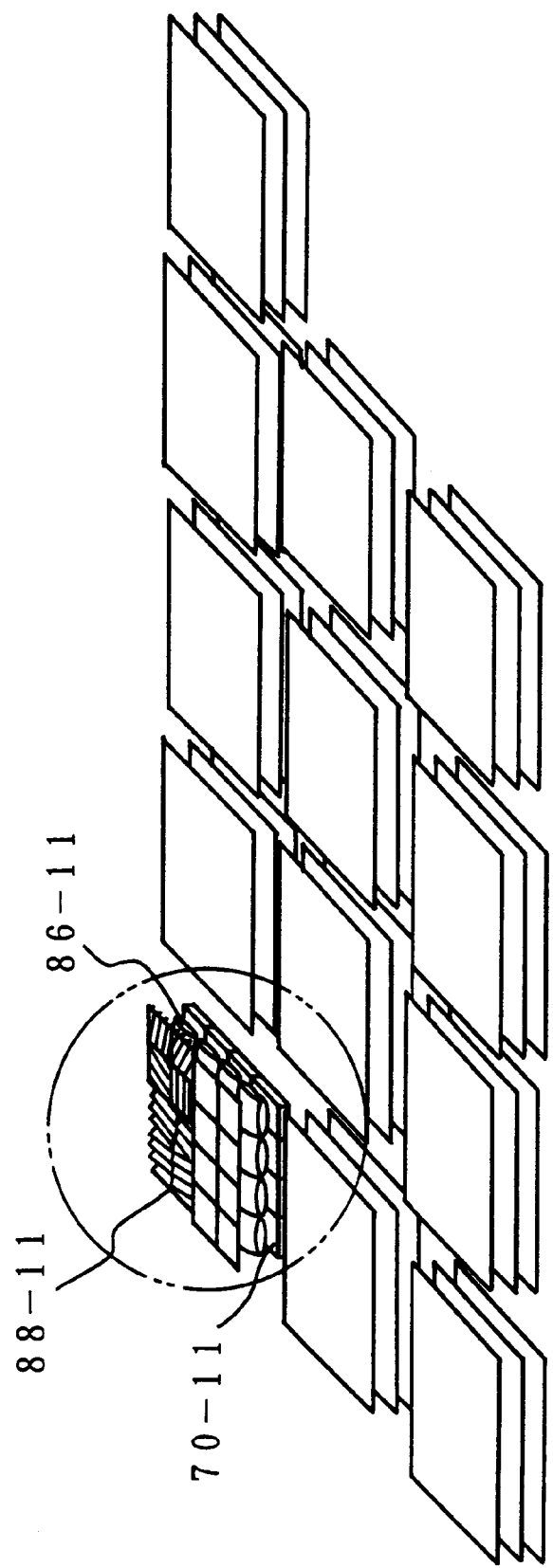
FIG. 11 is a partially enlarged explanatory drawing of the panel construction in FIG. 8.
Figure 12:
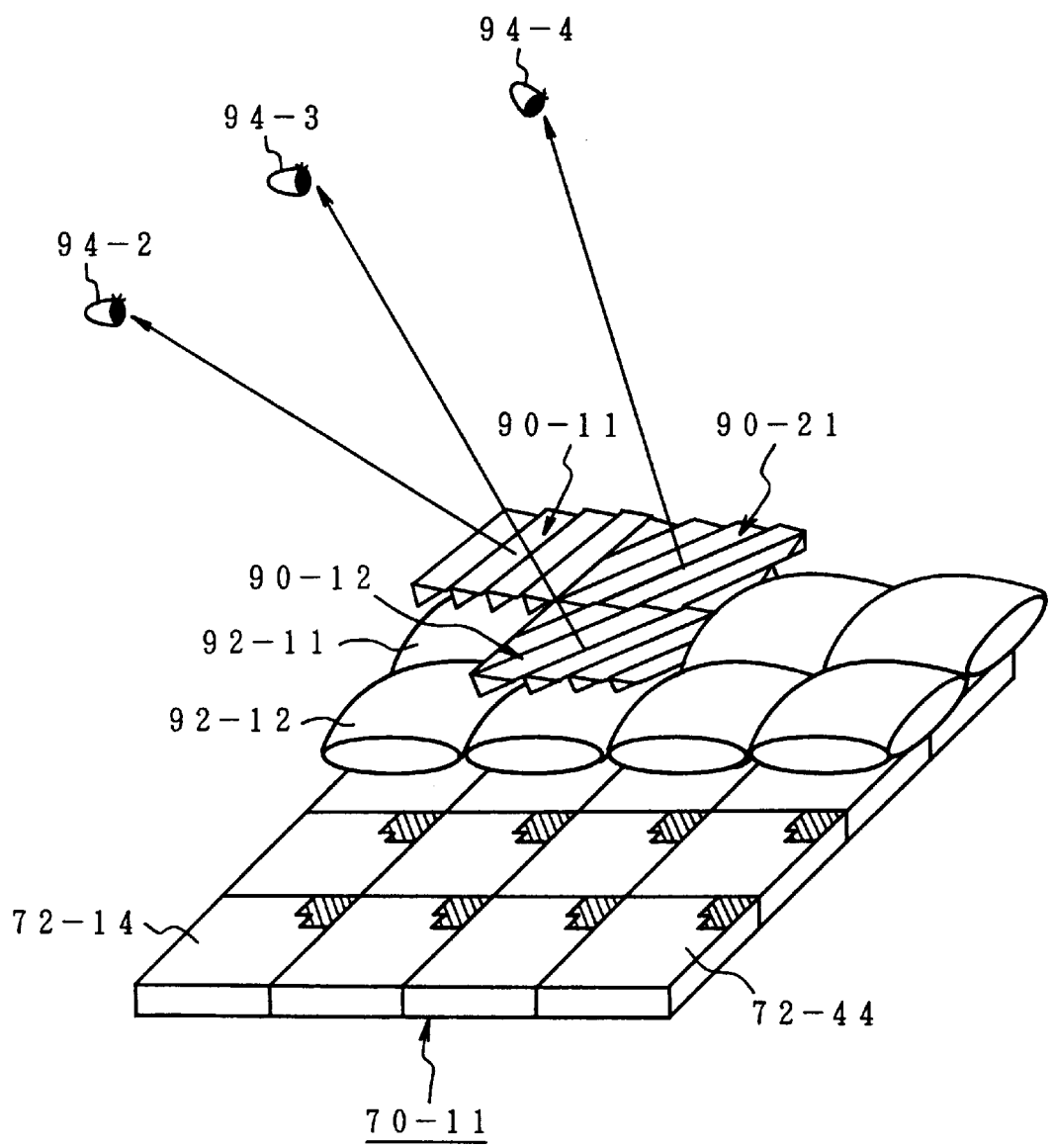
FIG. 12 is an explanatory drawing of a projecting function by a pixel block in FIG. 11.
Figure 13:
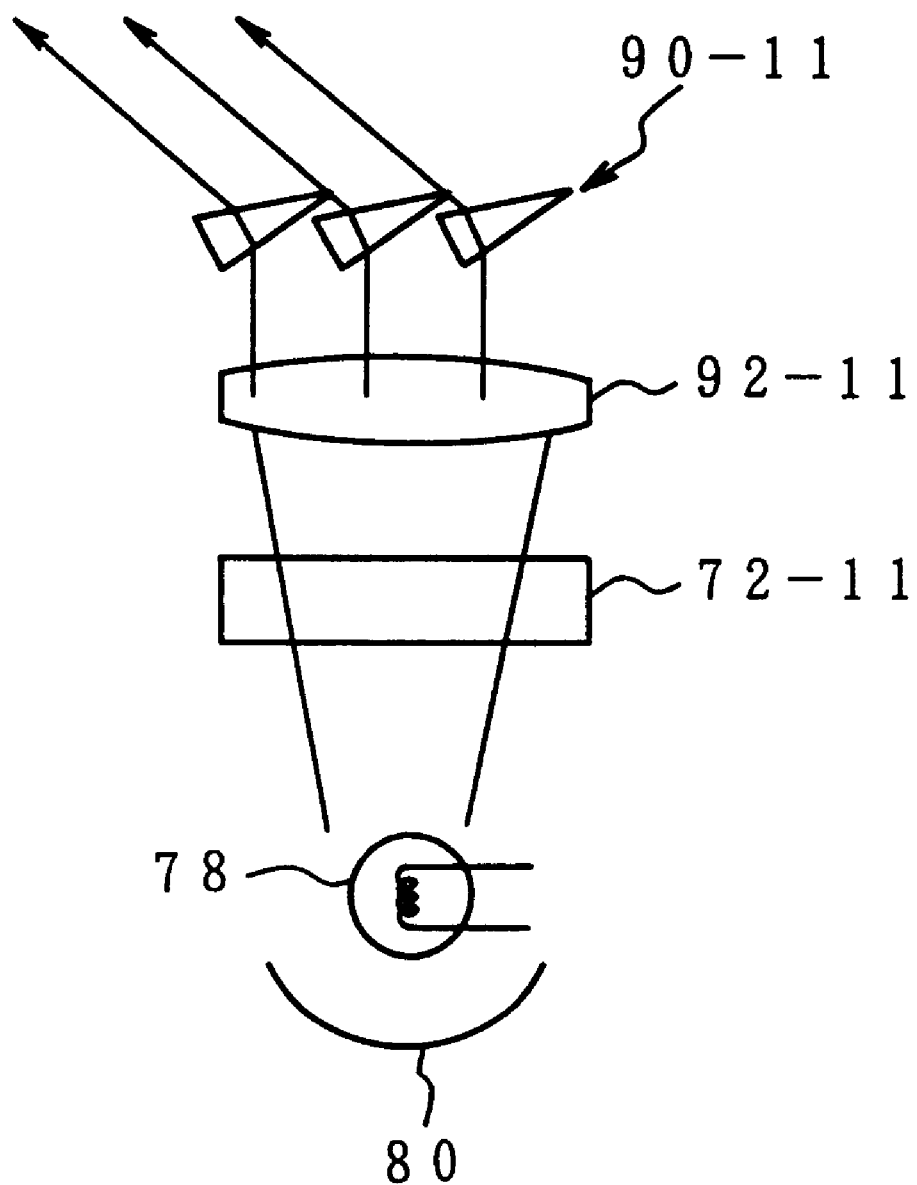
FIG. 13 is an explanatory drawing of a light source for the pixel in FIG. 12.

FIG. 11 is an enlarged drawing of the panel construction at the top left corner in FIG. 8. The three panels in FIG. 8, that is, the LCD panel 42, lens array 66, and prism array 68, constitute in FIG. 11 the pixel block 70-11, a lens block 86-11, and a prism block 88-11. These blocks, that is, the pixel block, lens block 86-11, and prism block 88-11, as enlarged in FIG. 12, array, for example, 16 pixels 72-11 to 72-44, that is, 4×4 pixels, and arrange similarly 16 lenses 92-11 to 92-44 thereon. Furthermore, 16 prisms 90-11 to 90-44 are arranged further thereon. In addition, in FIG. 12, the lens block 86-11 shows half of the full number of lenses, that is, eight lenses, and the prism block 88-11 also shows a part of the full number of prisms, 3 prisms. FIG. 13 shows setting of a projected direction of the light from a light source 78 using a lens 92-11 and a prism 90-11 corresponding to the pixel 72-11, the three components being taken from FIG. 12. Thus, the light from the light source 78 is reflected upward by the reflector 80, passes through the pixel 72-11 composed of a liquid-crystal cell, and then, is attenuated according to the driven state of the liquid-crystal cell. The light that passed through the pixels 72-11 is condensed by the lens 92-11, and is directed toward the projected region corresponding to the pixels 72-11 by the prism 90-11. For this reason, in FIG. 12, assuming that points of view corresponding to three prisms, 90-11, 90-21, and 90-12 are 94-2, 94-3, and 94-4 respectively, the light from respective pixels located in the lower part are deflected by the prisms 90-11, 90-12, and 90-21 toward the corresponding points of view 94-2, 94-3, and 94-4.

Figure 14:
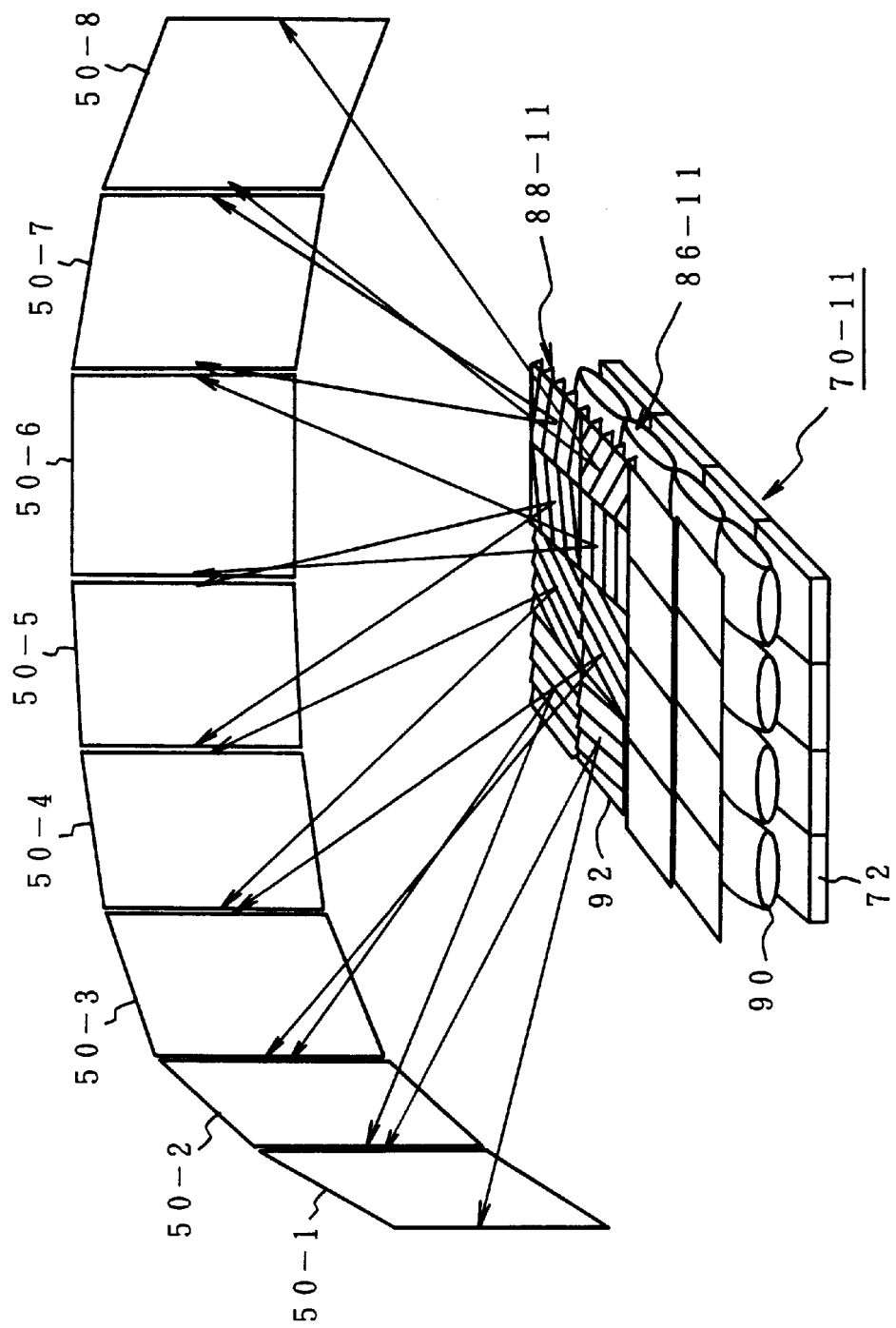
FIG. 14 is a detailed explanatory drawing of the pixel block in FIG. 12.

FIG. 14 shows projection states to projected regions corresponding to a plurality of pixels in one pixel block 70-11. For example, the light from eight pixels 72, forming the back half of the pixel block 70-11, enters into the prism 92 in the corresponding prism block 88-11 after being condensed by respective lenses in the corresponding lens block 86-11. Then, the light is projected to the corresponding projected regions 50-1 to 50-8.

Figure 15:
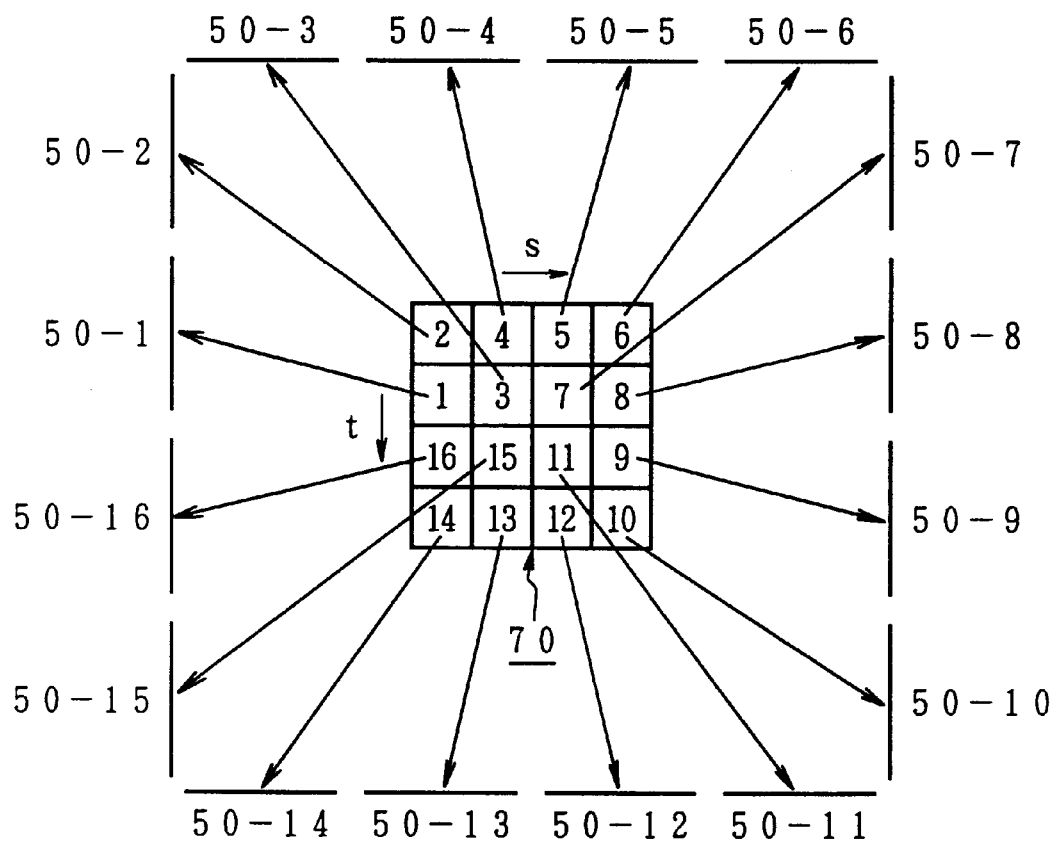
FIG. 15 is an explanatory drawing of an allocation state of pixel blocks to projected regions in FIG. 12.

FIG. 15 two-dimensionally shows projected directions of the light from 16 pixels established in the pixel block 70. Again, this is for the case where four projected regions are established per side of the display 44 as shown in FIG. 5, and located around the display 44. Namely, a pixel block 70 located at a specific position on the display is composed of 4 horizontal pixels (s=4) by 4 vertical pixels (t=4), that is, 16 pixels, and 16 projected regions 50-1 to 50-16 are established around the pixel block 70. According to projected regions 50-1 to 50-16, pixel allocation represented by numbers 1 to 16 are performed to respective pixels of the pixel block 70. Here, assuming that the coordinates of each pixel position in the pixel block 70 are (s, t), respective pixel addresses in the pixel block 70 to the parallax image numbers 1 to 16 corresponding to the projected regions 50-1 to 50-16 have corresponding relation shown in an address table in FIG. 16. In this manner, the allocation relation of respective pixels in the pixel block 70 to the projected regions is determined. Namely an address to a parallax image number, (s, t) is determined. In this case, mapping is performed by which pixels of the parallax images are written corresponding to positions of the allocated pixels. Then, so long as the contents of the mapped memory are read and displayed on an LCD panel, parallax images having different parallaxes can be projected in the sixteen projected regions 50-1 to 50-16 established around the display 44, as shown in FIG. 5.

Figure 17:
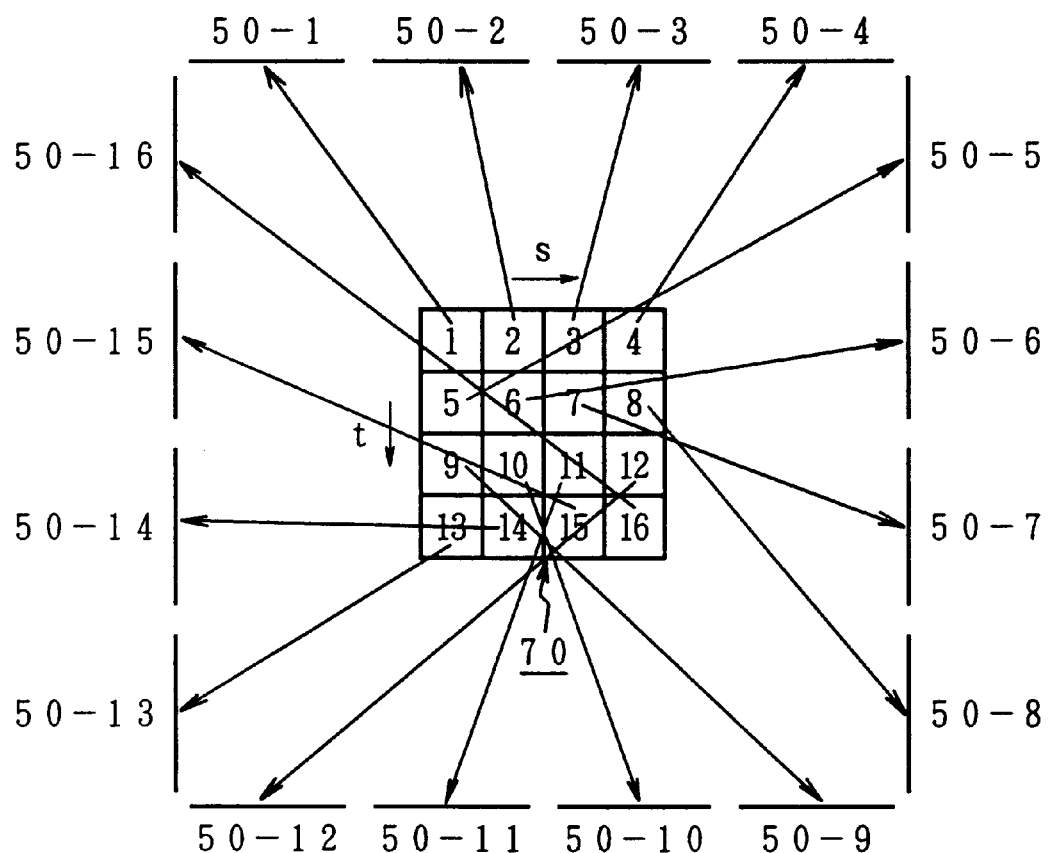
FIG. 17 is an explanatory drawing of another allocation state of pixel blocks to projected regions in the present invention.

FIG. 17 is another embodied form of an allocation state of the sixteen pixels constituting a pixel block 70 to the sixteen projected regions 50-1 to 50-16 established around the display screen. That is, in the embodied form in FIG. 15, two horizontal pixels by two vertical pixels, namely, 4 pixels in the pixel block 70, are made to correspond to the four projected regions arranged in a line on a side. In the embodied form shown in FIG. 17, pixels represented by numbers 1 to 16 are allocated to the sixteen projected regions 50-1 to 50-16 by setting a horizontal direction as a primary scanning direction and setting a vertical direction as a secondary scanning direction. Addresses (s, t) of allocated pixels in the pixel block 70, in this case, to the parallax image numbers 1 to 16 corresponding to the projected regions 50-1 to 50-16, are shown in the address table in FIG. 18.

Of course, without being limited to the allocation relation of the sixteen pixels in the pixel block 70 in FIGS. 15 and 17 to the projected regions 50-1 to 50-16, it can be realized to perform allocation of adequate corresponding pixels in the pixel block 70 according to the set states of the projected regions around the display screen. So long as this relation is registered in such an address table as either of those in FIGS. 16 and 18, a pixel address (s, t) in the corresponding pixel block can be known using a parallax image number, namely, one of projected regions 50-1 to 50-16 as an index. Therefore, it can be realized to perform mapping of each pixel in separately generated parallax images to the rendering memory.

Figure 19:
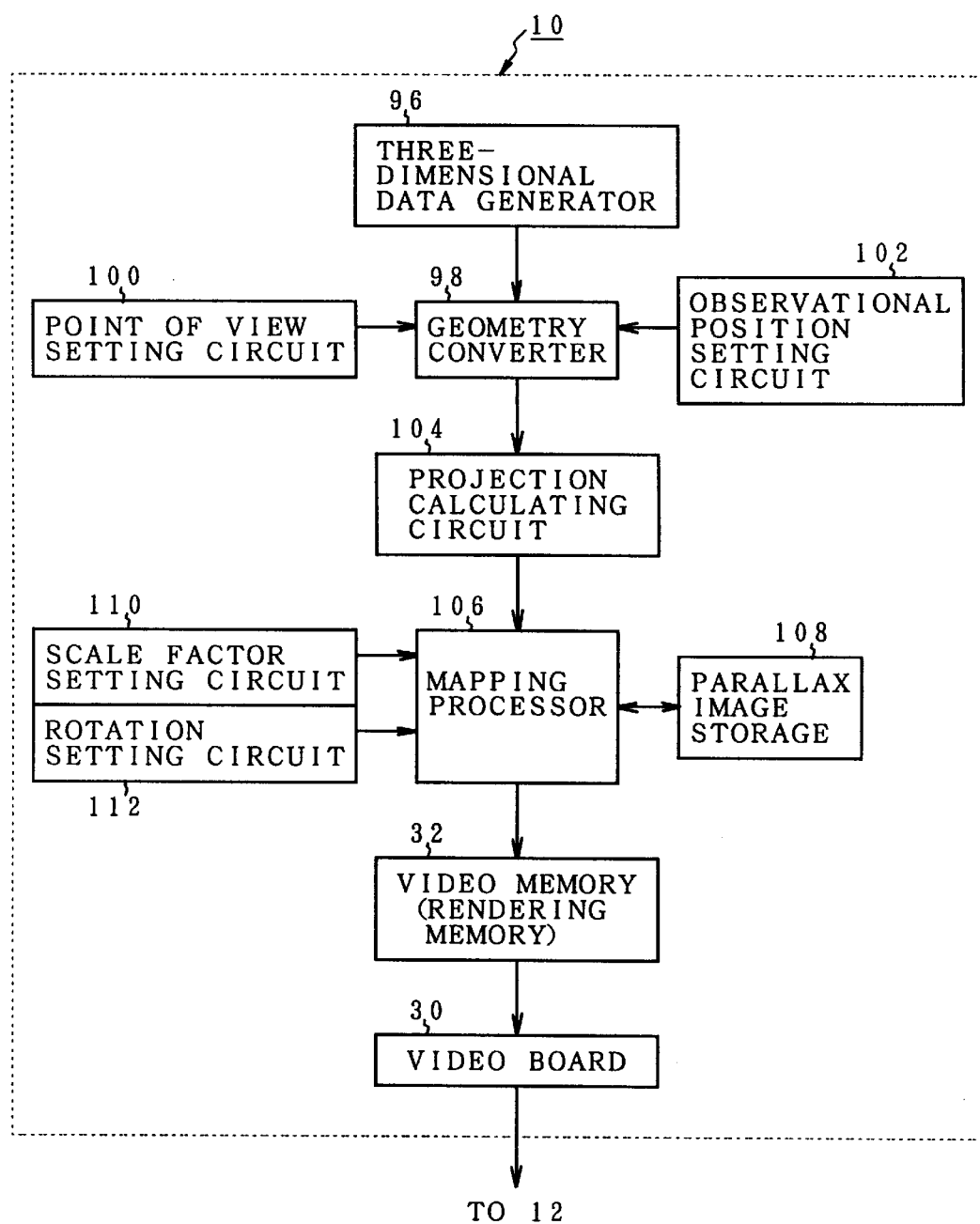
FIG. 19 is a function block diagram of the station construction in FIG. 3.

GENERATION OF PARALLAX IMAGES:

FIG. 19 is a functional block diagram of parallax image generation by the parallax image generation module 16 executed by the CPU 14 provided in the parallax image generation unit 10 shown in FIG. 3. These functional blocks for parallax image generation are composed of a three-dimensional data generator 96, a geometry converter 98, a point of view setting circuit 100, an observational position setting circuit 102, a projection calculating circuit 104, a mapping processor 106, a parallax image storage 108, a scale factor setting circuit 110, and a rotation setting circuit 112. Mapped results by the mapping processor 106 are written in rendering memory 32 functioning as video memory 32, and sent to the parallax image display unit 12 shown in FIG. 3 for displaying. In such a function of parallax image generation, using the three-dimensional data generator 96, geometry converter 98, point of view setting circuit 100, observational position setting circuit 102, and projection calculating circuit 104, parallax images are generated from a 3-D object, the parallax images which correspond to the projected regions 50-1 to 50-16 established around the display 44 as shown in FIG. 5.

Figure 20:
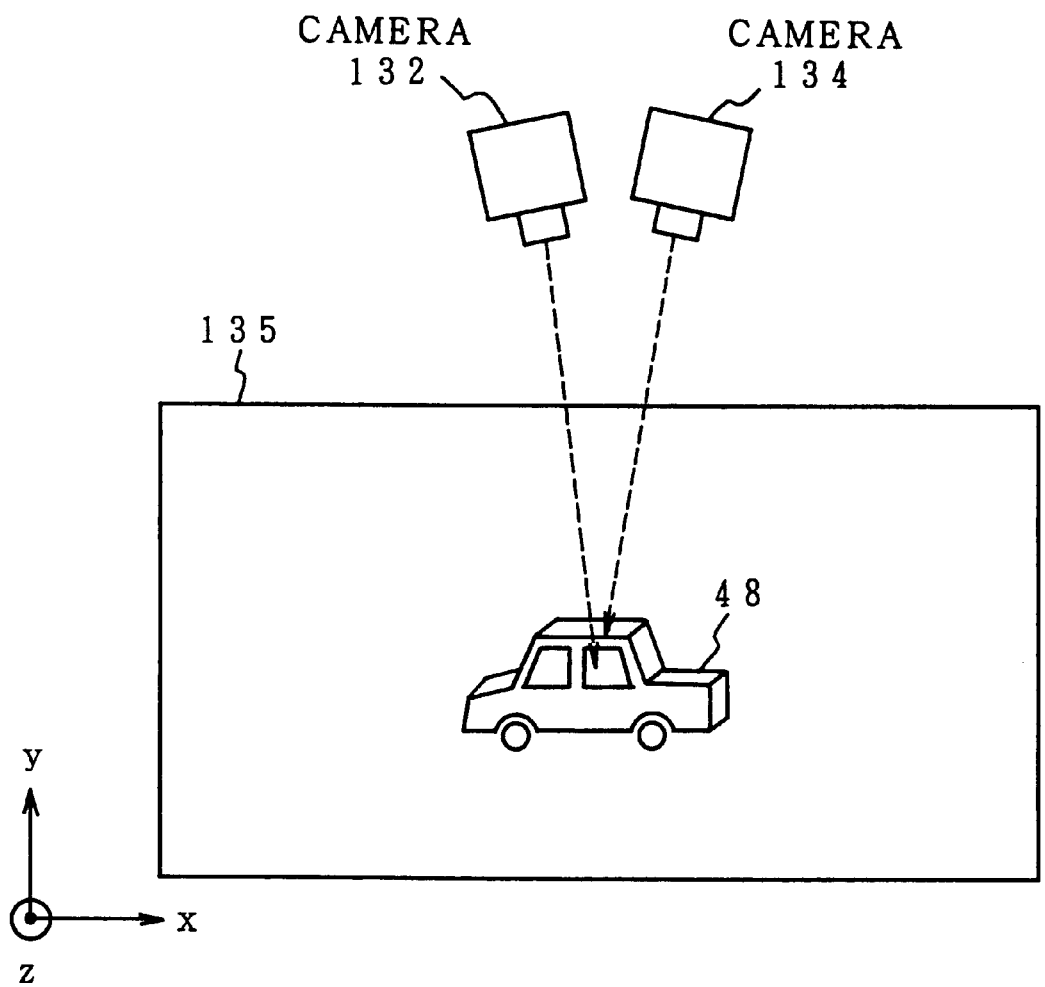
FIG. 20 is an explanatory drawing of generation of parallax images by shooting with camera.

FIG. 20 is an explanatory drawing of parallax image generation using cameras. A car that is an object to be actually displayed three-dimensionally is placed in a virtual display space 135, and a plurality of projected regions 50-1 to 50-16 established as shown in FIG. 5 are supposed to this virtual display space 135. Then, the object 48 is shot respectively by the cameras 132 and 134 which are located, for example, at positions of points of view determined as positions corresponding to two adjacent projected regions. In this case, the camera 132 corresponds to the right eye of an observer, and the camera 134 to the left eye.

Figure 21A:
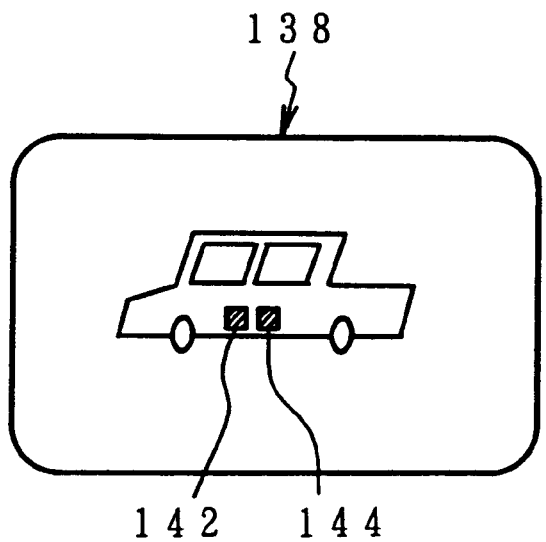
FIGS. 21A and 21B are explanatory drawings of parallax images obtained in FIG. 21.
Figure 21B:
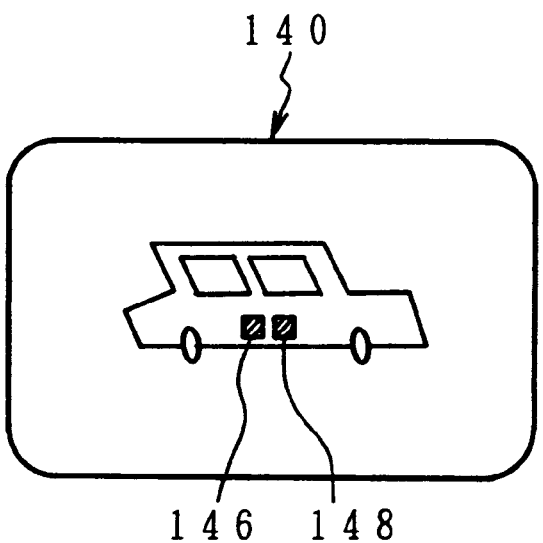

FIG. 21A is a parallax image for the right eye, 138 shot with the camera 132 in FIG. 20, and FIG. 21B is a parallax image for the left eye, 140 of the object 48 shot with the camera 134 in FIG. 20.

Except actually shooting the object with cameras as shown in FIG. 20, by generating a 3-D object 48 using computer graphics and the like, and establishing points of view corresponding to projected regions around the virtual object generation space 135, it is also possible to generate respective parallax images as those in FIGS. 21A and 21B as shot images of the object 48 observed at respective points of view. In addition, regarding generation of the parallax images with cameras, by locating a camera per projected region or projected regions, actually taking parallax images, and performing interpolating processing for the parallax images of the projected regions without cameras, it is also possible to generate parallax images of respective projected regions.

FIG. 22 is an explanatory drawing of the case that specific pixels 142, 144, and 146, 148 in the parallax image for the right eye, 138, and the parallax image for the left eye, 140 as obtained in FIGS. 21A and 21B are displayed and projected. The pixel block 150 in the LCD panel 42 corresponds to the pixel 142 of the parallax image for the right eye, 138 in FIG. 21A and the pixel 146 of the parallax image for the left eye, 140 in FIG. 21B. In addition, the pixel block 152 in FIG. 22 corresponds to the pixel 144 of the parallax image for the right eye, 138 in FIG. 21A and the pixel 148 of the parallax image for the left eye, 140 in FIG. 21B.

Figure 23:
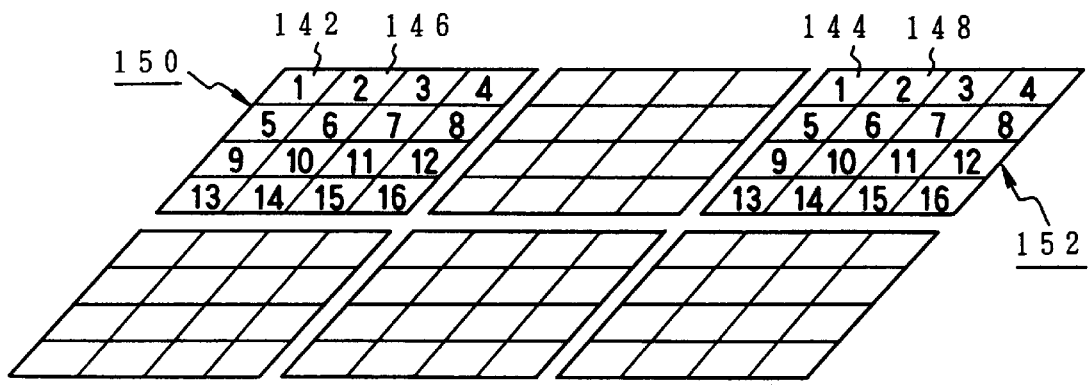
FIG. 23 is an enlarged drawing of a pixel block portion in FIG. 22.

FIG. 23 shows pixel blocks 150 and 152 fetched from the LCD panel 42 in FIG. 22. Assume that the pixel block 150 is composed of 4×4 pixels, that is, 16 pixels, for example, parallax image numbers 1 to 16 shown by numbers 1 to 16 numbered to respective pixels are allocated, and the image number of the parallax image for the right eye, 138 in FIG. 21A is No. 1 and the image number of the parallax image for the left eye, 140 in FIG. 21B is No. 2. In this case, the pixel 142 of the parallax image for the right eye, 138 in FIG. 21A is mapped at the pixel number 1 in the pixel block 150 in FIG. 23 as a parallax pixel for the right eye, 142. In addition, the pixel 146 of the parallax image for the left eye, 140 in FIG. 21B, the pixel 146 having the same position as the pixel 142, is mapped at the pixel number 2 in the same pixel block 150 as a parallax pixel for the left eye, 146. Under the mapped states of pixels 142 and 146 of different parallax images 138 and 140 to the pixel block 150, the pixels 142 and 146 being at the same position in FIGS. 21A and 21B, the light from the light source enters from the lower part as shown in FIG. 22. After the light is condensed by a corresponding lens in the lens array 66 and thereafter passes through the parallax pixel for the right eye, 142 in FIG. 23, it is projected to the right eye 54 of the observer 52 existing in the corresponding projected region 50-1 by the corresponding prism in the prism array 68 arranged on the lens array 66. Simultaneously, the light passing through the parallax pixel for the left eye, 146 is projected to the left eye 56 of the observer 52 existing in the adjacent projected region 50-2 in FIG. 22. Thus, the observer 52 receives the light from the parallax pixel for the right eye, 142, with the right eye 54, and receives the light from the parallax pixel for the left eye, 146, with the left eye 56. Such projection of light passing through respective pixel to projected regions is performed similarly for all pixel blocks, and consequently, the light projected from a pixel block is seen as an pixel in each projected region. In this case, since observer's eyes always exist separately in two adjacent regions, the observer can recognize a 3-D image by seeing adjacent different parallax images.

Figure 24:
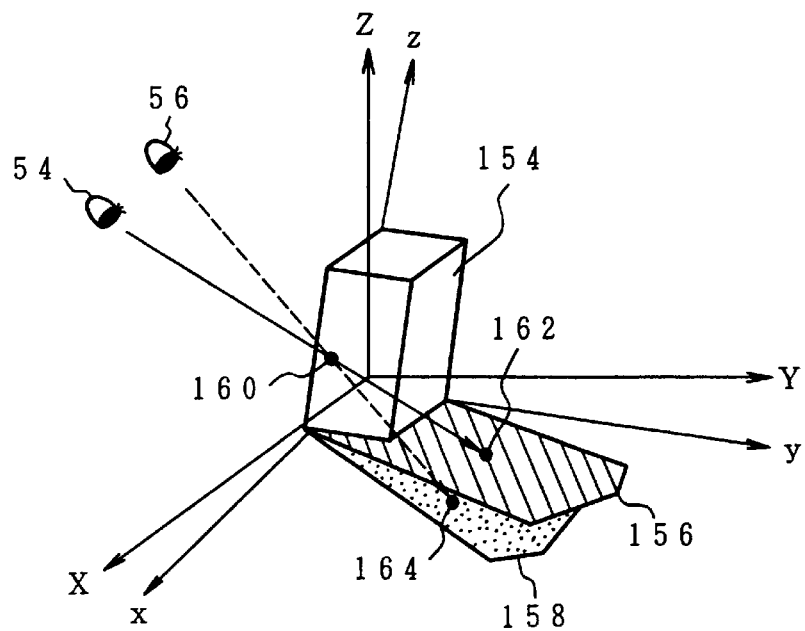
FIG. 24 is an explanatory drawing of projection processing for generation of parallax images using computer graphics.
Figure 25:
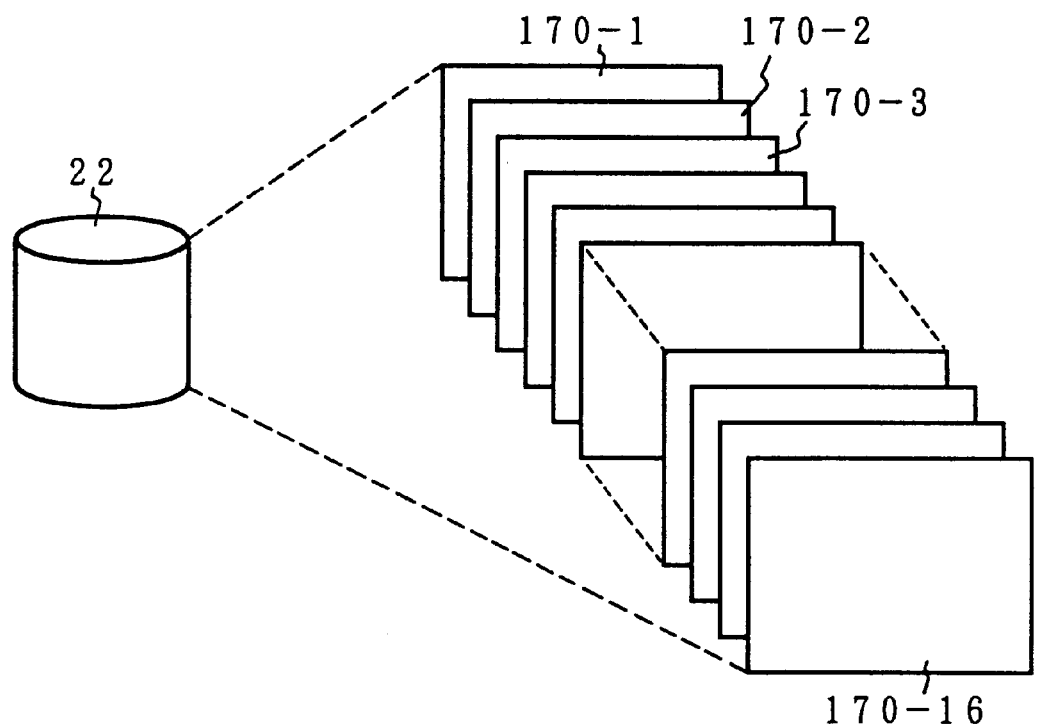
FIG. 25 is an explanatory drawing of a filing state of parallax images.

FIG. 24 is an explanatory drawing of projection calculation for generating two-dimensional images from a 3-D object in the projection calculating circuit 104 shown in FIG. 19. Here, the coordinate system (X, Y, Z) is the system for three-dimensional generation space in a display screen, on the other hand, the coordinate system (x, y, z) is the system for the object 154 itself, and both coordinate systems are generally different. The object 154 is located at an optional position in the 3-D generation coordinate system (X, Y, Z), and parallax image generation is performed by setting a plurality of projected regions established around the object 154 as positions of points of view. In this description, the case that the point of view for the right eye, 54 and the point of view for the left eye, 56 are established in two adjacent projected regions is exemplified. As a parallax image for the point of view for the right eye, 54, a line passing through a dot, constituting the object 154 and being selected as a sample point, from the point of view for the right eye, 54 is established. For example, regarding the pixel data of the sample point 160 located on the outside surface of the object 154 seen from the point of view for the right eye, 54, the position of a projected point 162 on the display plane (X, Y) which is its projected point becomes the pixel position. Further, as pixel data of the projected point 162 to become the pixel position, by adding an attenuated value of light between the projected point 162 and sample point 160 to a pixel value of the object 154 at the sample point 160, for example, intensity, new intensity is obtained, which is saved at the pixel position of the projected point 162. Similarly, regarding the sample point 160 of the object 154, a parallax pixel seen from the point of view for the left eye, 56 becomes a projected point 164 on the display plane (X, Y) which a line shown by a broken line reaches after passing through the object 154. Further, the pixel data of the projected point 164 is set to be the value obtained by adding an attenuated value of light due to propagation between the projected point and sample point 160 to the intensity of the sample point 160. By performing the projection calculation for all sample points of the object 154 which are similar to such the sample point 160, it is possible to generate respective parallax image data, namely, the parallax image for the right eye, 156 and parallax image for the left eye, 158, on the display plane (X, Y). In addition, as the pixel data for the projected points 162 and 164 of respective points of view, 54 and 56 to the sample point 160, except the intensity value obtained by adding an attenuated value between the projected point and sample point 160 to the intensity of the sample point 160, if the surface texture of the object 154 is determined, the texture value itself may be set to be the pixel value of the projected points 162 and 164. For example, by projection of parallax images through establishing points of view corresponding to the sixteen projected regions 50-1 to 50-16, sixteen kinds of parallax images 170-1 to 170-16 are saved in the system disk file 22 as shown in FIG. 25. The contents of the parallax images 170-1 to 170-16 saved in the system disk file 22 are included in the parallax image storage 108 in FIG. 19.

Figure 26:
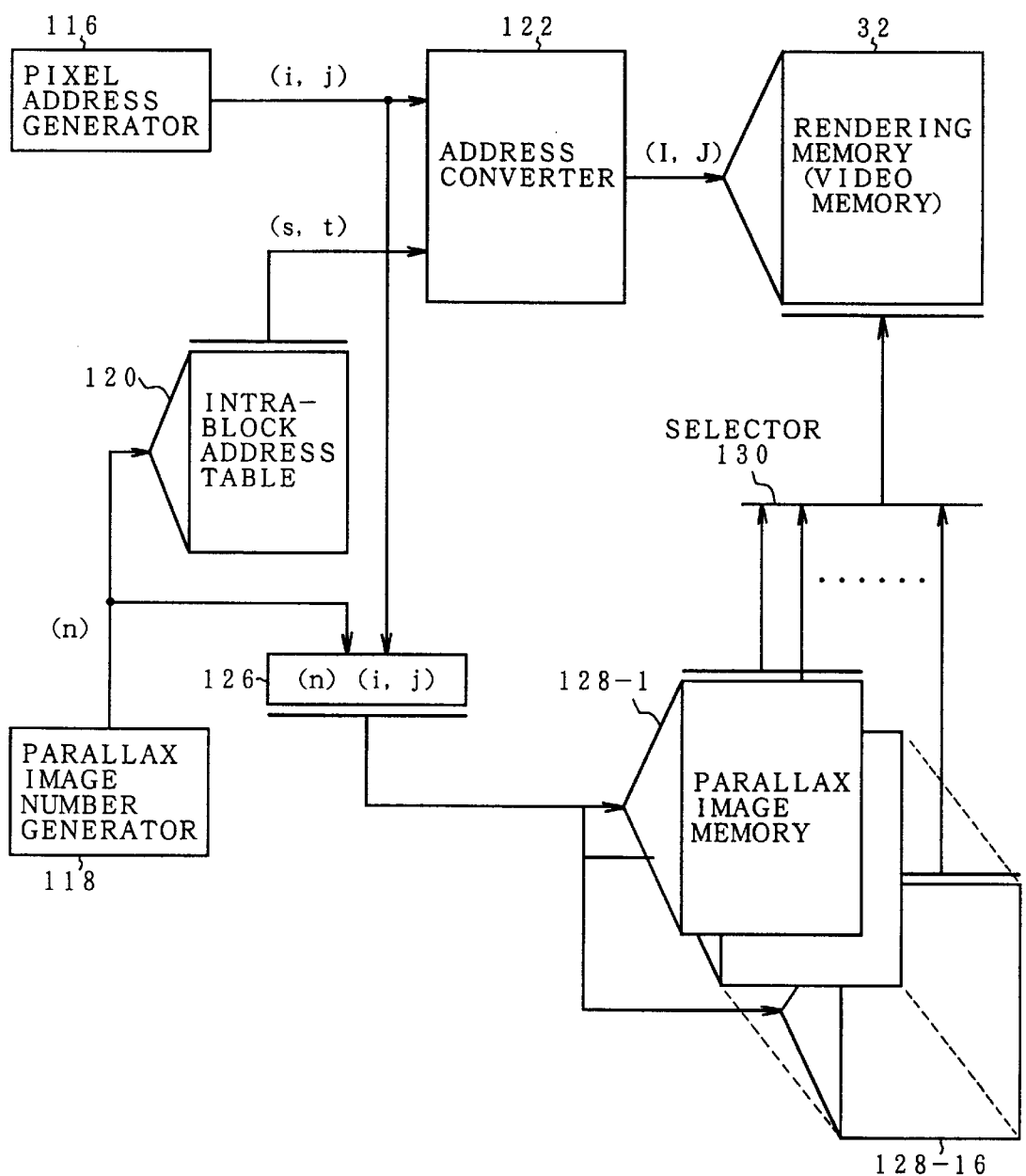
FIG. 26 is a function block diagram of the mapping processor in FIG. 3.
Figure 27:
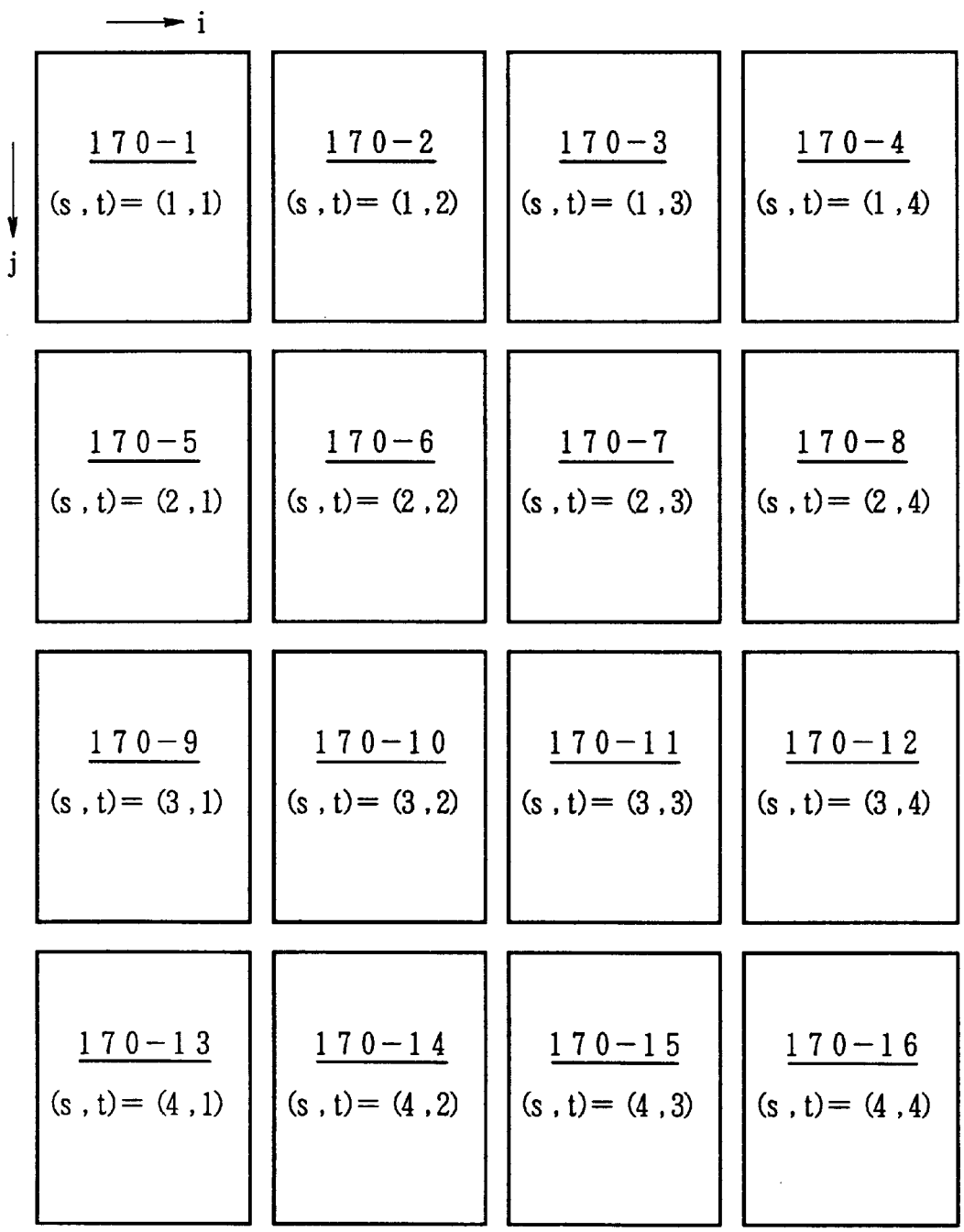
FIG. 27 is an explanatory drawing of respective parallax images and allocated addresses of pixel blocks in case a projected region count is 16.

Next, in the mapping processor 106 in FIG. 19, mapping is performed for a plurality of parallax images 170-1 to 170-16 to the rendering memory corresponding to respective pixels of the LCD panel 42 divided into blocks as shown in FIG. 10. FIG. 26 is a functional block diagram of the mapping processor 106 shown in FIG. 19. The mapping processor comprises a pixel address generator 116, a parallax image number generator 118, an intra-block address table 120, an address converter 122, a register 126, parallax image memory 128-1 to 128-16, and rendering memory 32 that is the attendee of mapping. The sixteen parallax images 170-1 to 170-16 saved in the system disk file 22 are loaded in the parallax image memory 128-1 to 128-16, as shown in FIG. 25. In this case, the parallax images 170-1 to 170-16 saved in the parallax image memory 128-1 to 128-16 are allocated to respective pixels constituting one pixel block shown in FIG. 27. The allocation shown in FIG. 17 is instanced for the allocation of parallax images to pixels in a pixel block shown in FIG. 27, and hence, the address table shown in FIG. 18 is used as the intra-block address table 120 in FIG. 26. Mapping of respective parallax images saved in the parallax image memory 128-1 to 126-16 to the rendering memory 32 in FIG. 26 are as follows. The parallax image number generator 118 sequentially generates the parallax image number n, 1 to 16, the pixel address generator 116 generates pixel addresses (i, j) for pixels of one parallax image each time the parallax image number n, 1 to 16 is generated, and consequently, mapping is performed. For example, taking the case of mapping of the first parallax image 170-1 in FIG. 27 to the rendering memory 32, the mapping is performed as follows. First, the parallax image number generator 118 generates the parallax image number, n=1, and thereby, the intra-address table 120, as apparent from the contents of the table in FIG. 18, reads (1, 1) as the address (s, t) corresponding to the parallax image number 1 to output it to the address converter 122. To the address converter 122, pixel addresses (i, j)=(1, 1), (2, 1), (3, 1), ..., (M, 1), ..., (M, N) are sequentially generated which are the sequentially designated pixel addresses of i horizontal pixels by j vertical pixels in the top left image in FIG. 27, namely, the parallax image 170-1. The address converter 122 allocates one pixel address per pixel block in the rendering memory 32 using the intra-block address (s, t) read from the intra-block address table 120 each time the address converter 122 is given one pixel address (i, j) by the pixel address generator 116. The allocation of one pixel of a presently processed parallax image to a pixel block in the rendering memory 32 is address conversion processing for allocating pixels of the parallax images per pixel block at intervals, that is, conversion processing to some kind of arithmetic progression.

Figure 28:
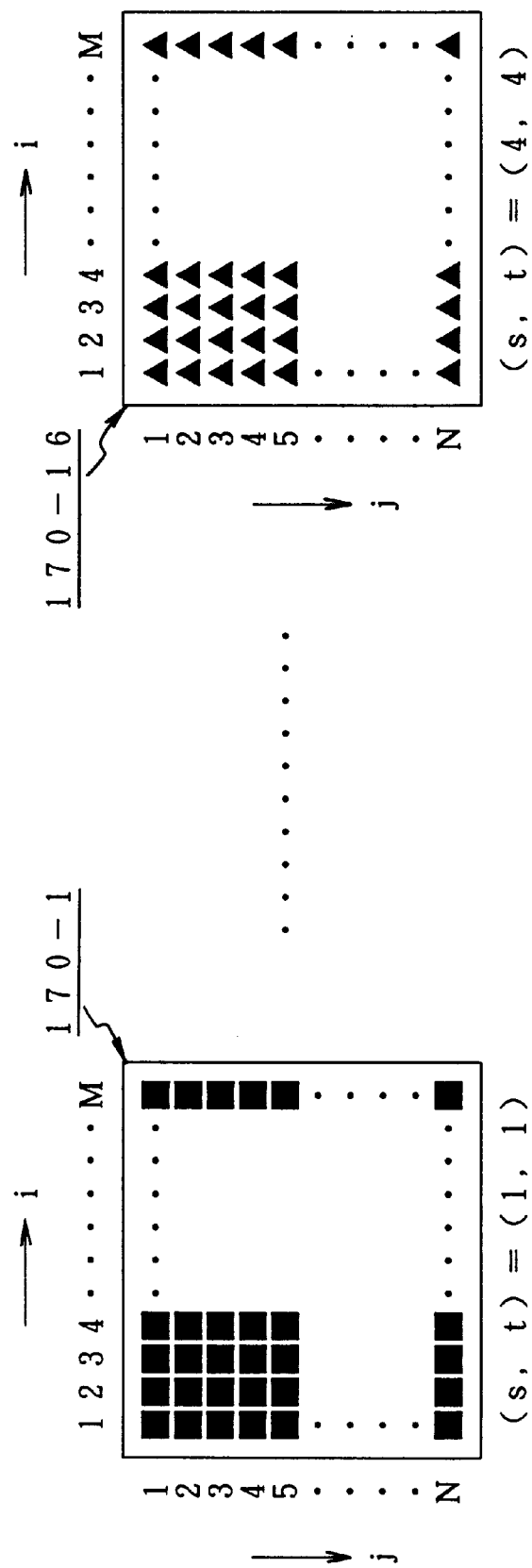
FIG. 28 is an explanatory drawing showing an example saving pixels of parallax images.
Figure 29:
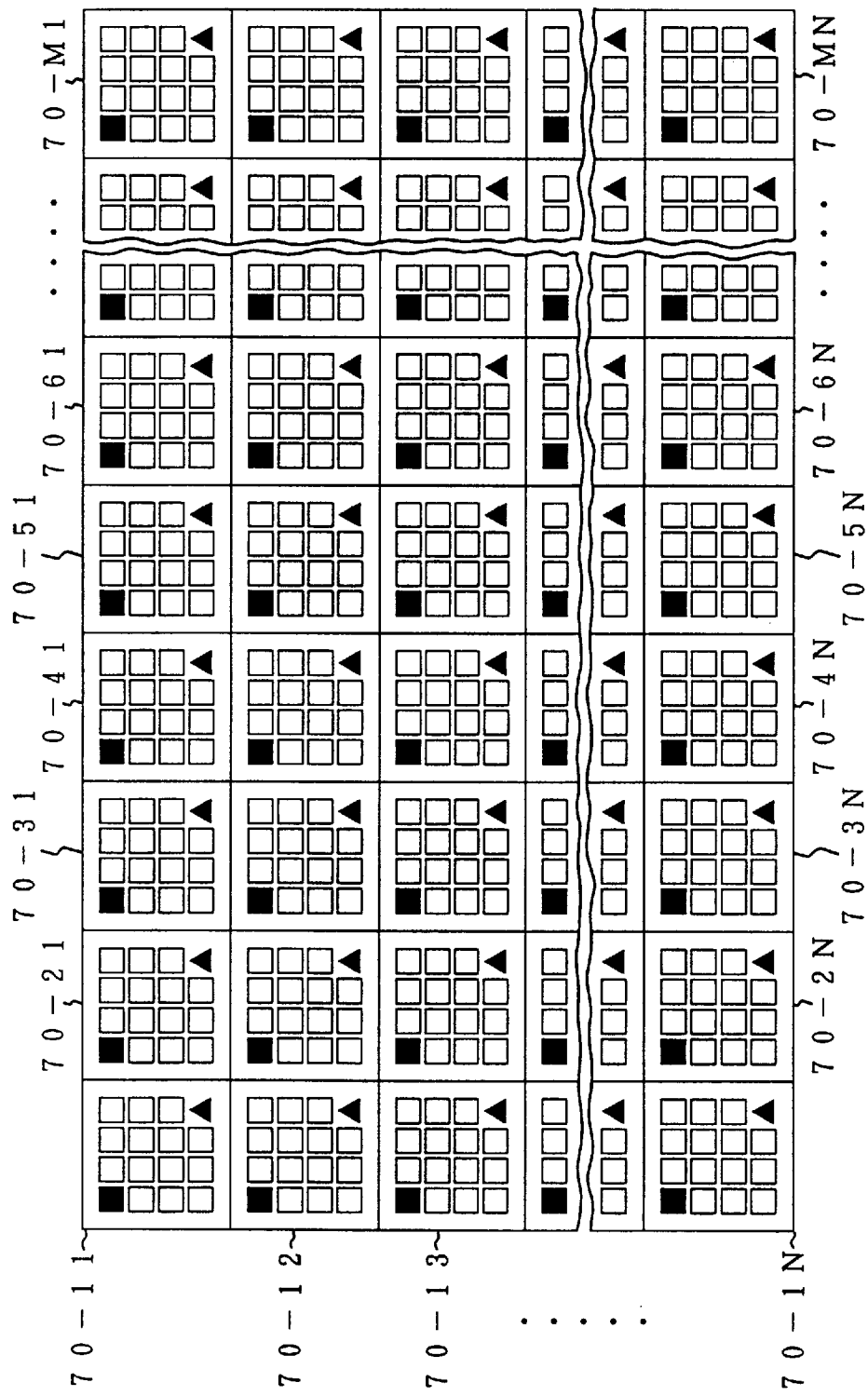
FIG. 29 is an explanatory drawing of rendering memory where pixels of the parallax images shown in FIG. 28 are mapped every pixel block.

In FIG. 28, pixels of the first parallax image 170-1 and the last, sixteenth parallax image 170-16 are represented by black-filled quadrangles and black-filled triangles. FIG. 29 shows the mapping result of the parallax images 170-1 and 170-16 shown in FIG. 28. First, regarding the parallax image 170-1 in FIG. 28, mapping is performed, as shown in FIG. 29, to the top address (s, t)=(1, 1) in each of pixel blocks 70-11 to 70-MN in the rendering memory 32 shown in FIG. 29. On the other hand, as for the last parallax image 170-16 in FIG. 28, since the allocated address (s, t) in a pixel block is (4, 4), mapping is performed, as shown in FIG. 29, to the last pixel positions in the pixel blocks 70-11 to 70-MN. It is comprehensible that this mapping from FIG. 28 to FIG. 29 is conversion to an arithmetic progression, judging from mapping in the horizontal direction of the pixel blocks in FIG. 29. Similarly, as for mapping in the vertical direction, it is also conversion to the arithmetic progression, and difference of them is only the initial positions in the first pixel block 70-11. Consequently, the address conversion for mapping of respective parallax images to the rendering memory 32 in the address converter 122 shown in FIG. 26 can be expressed in the following general expressions for conversion to an arithmetic progression, assuming that each pixel address of a plurality of parallax images is (i, j), a pixel address in one pixel block is (s, t), a horizontal pixel count is S ($1 \leq s \leq S$), the total pixel count is T ($1 \leq t \leq T$), and an address in the rendering memory 32 after conversion is (I, J):

$$I = s + S(i-1)$$

$$J = t + T(j-1)$$

For example, the first parallax image 170-1 in FIG. 28 has the allocated address in the block (s, t)=(1, 1), and, by converting to an arithmetic progression the fist line varying from i=1 to i=M at j=1, address conversion such that I=1, 5, 9, 13, ..., {1+4(M−1)} with J=1 can be performed. In parallel with the conversion of the parallax image address (i, j) to mapping address (I, J) in the rendering memory 32, the parallax image number n and pixel address (i, j) at that time are set in the register 126, and, since the parallax image number n is 1, the parallax image memory 128-1 is selected. Simultaneously, using the pixel address (i, j), the pixel data at the designated address in the parallax image memory 128-1 is read, which is provided as write data to the rendering memory 32 through a selector 130. Owing to this, the parallax image is written at the mapping address (I, J) in the rendering memory 32. Further, by similar processing being repeated for the parallax image number n, 1 to 16 from the parallax image number generator 118, it is possible to perform mapping of pixel data of all parallax images in a lump per pixel block. When the mapping to the rendering memory 32 is completed, the data, as quite similarly to usual data in the rendering memory thereafter, is transferred to the LCD controller 36 in FIG. 3, and displayed on the LCD panel 42 by the driver circuits 38 and 40. If the data can be displayed on the LCD panel 42, owing to the panel construction in FIG. 11, the light from pixels in each pixel block is projected to, for example, as shown in FIG. 14, the corresponding projected regions 50-1 to 50-16. Since an observer always positions his/her right eye and left eye in two adjacent projected regions respectively, the observer can recognize the 3-D image by seeing two parallax images.

Figure 30:
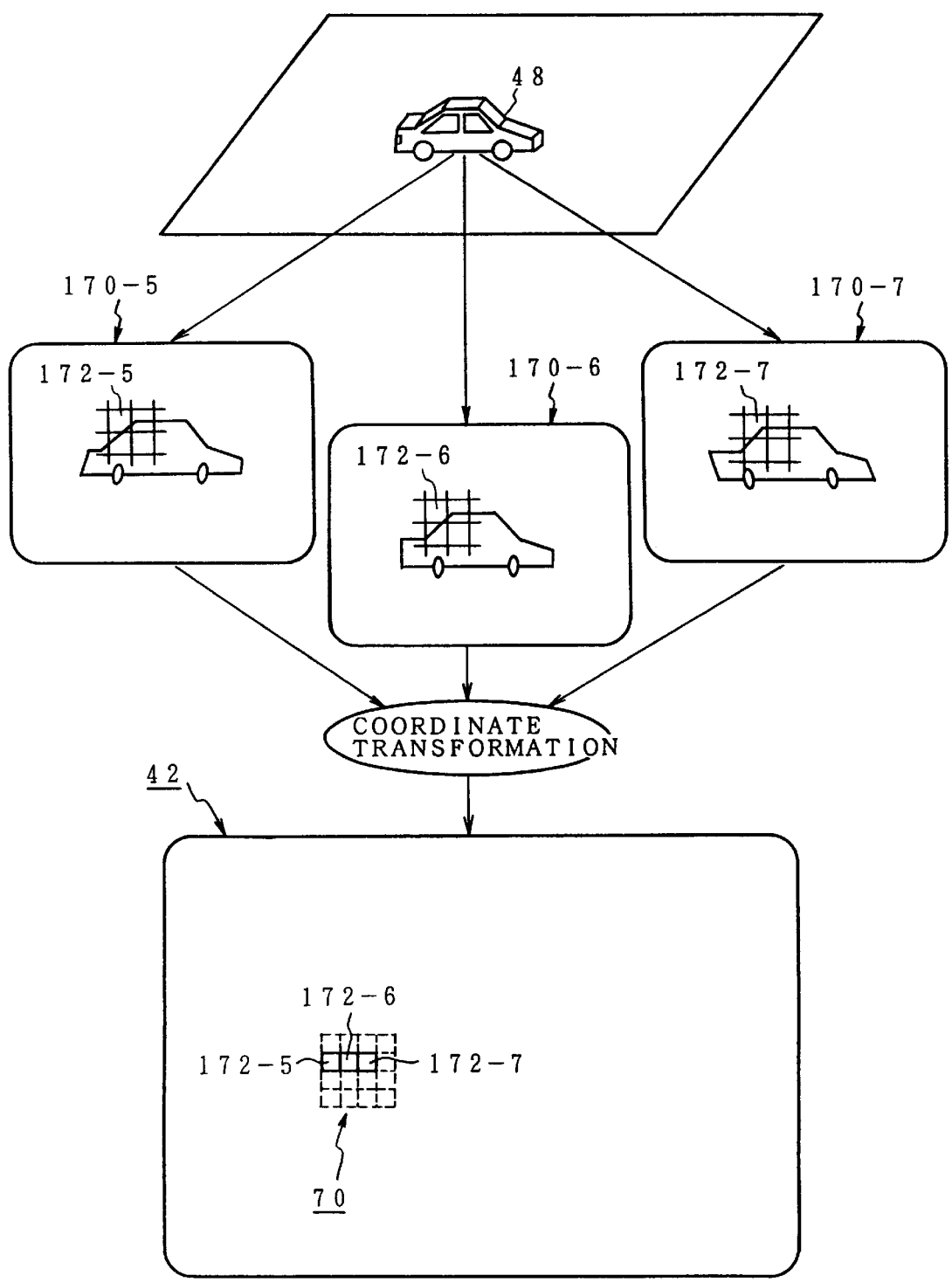
FIG. 30 is an explanatory drawing of a concrete example from generation of parallax images to mapping of them.

FIG. 30 shows the procedure of the present invention from generation of parallax images to writing to and displaying pixels on the LCD panel 42 based on mapping of the rendering memory. For example, regarding the object 48, three adjacent parallax images 170-5 to 170-7 are generated, and after mapping to the rendering memory using coordinate transformation, the parallax images are written to the LCD panel 42. Here, instancing pixels 172-5 to 172-7, having the same position, in the three parallax images 170-5 to 170-7, these three pixels 172-5 to 172-7 are written to display-pixels of the same pixel block in the LCD panel 42 as pixels 172-5 to 172-7, and these are projected to respective projection directions.

Figure 31A:
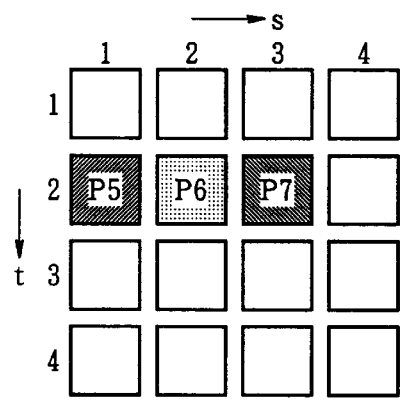
FIGS. 31A to 31C are explanatory drawings of rewriting rendering memory for enlarging or rotating a 3-D image.
Figure 31B:
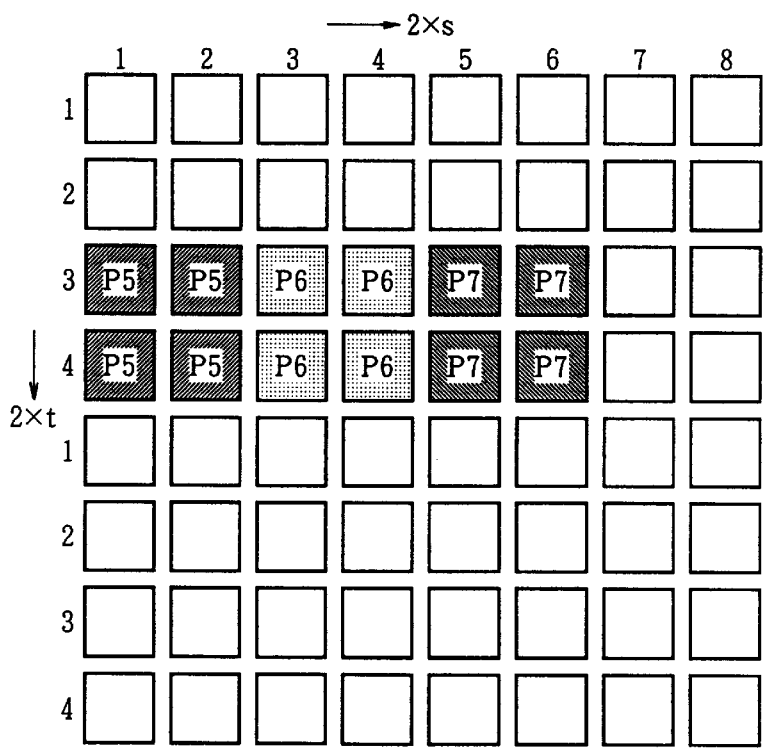
Figure 31C:
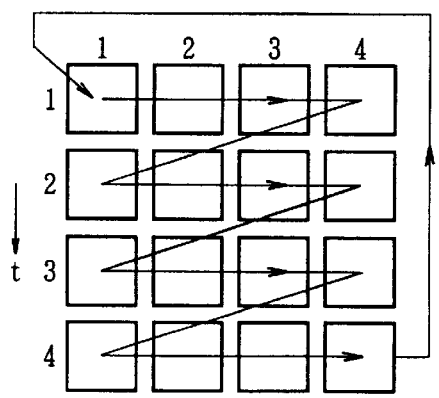

FIGS. 31A to 31C are explanatory drawings of rewriting processing for enlargement and rotation of a 3-D image after mapping to the rendering memory 32 processed by the mapping processor 106 shown in FIG. 19. FIG. 31A, for example, instancing three parallax images 170-5 to 170-7 in FIG. 29, shows the state of the pixel block 70 where the pixels 172-5 to 172-7, having the same position, are mapped, and, for example, assume that pixel data P5, P6, and P7 are written at their corresponding pixel positions. In case the mapped image in the pixel block 70 is enlarged twice, as shown in FIG. 31B, the pixel block may be set to be twice in the vertical and horizontal directions. Thus, the pixel block is made to be 2×S pixels in the horizontal direction and 2×T pixels in the vertical direction, namely, four pixel blocks are allocated that have four-times pixels as many as those of a pixel block having one magnification. Similarly, as for pixels P5 to P7 in FIG. 31A, two pixels in the horizontal direction and two pixels in the vertical direction, that is, four pixels are allocated, and the same pixel data P5 to P7 may be written.

FIG. 31C shows the shift of pixel positions within a pixel block for rotating a 3-D image. Here, assume that the pixel allocation shown in FIG. 17 to the projected regions 50-1 to 50-16 shown in FIG. 5 in the pixel block 70 is performed. The allocated numbers 1 to 16 in the pixel block 70 of FIG. 17 are connected in a loop as shown in FIG. 31C, and each pixel may be shifted by one pixel as shown by arrows. In company with this loop-like shift of pixels, for example, a pixel projected to the projected region 50-1 in FIG. 5 is projected to the projected region 50-2 in the next shift, and hereafter, the projected region is switched to 50-3 to 50-16 in turn. Therefore, if an observer sees the 3-D image with the points of view fixed to specific projected regions, the observer can see that the object 48 three-dimensionally displayed on the display 44 is rotating. The rotation speed in this case can be changed by the shift speed of each pixel along the loop in FIG. 31C. In addition, if the shift direction is reversed, reverse rotation can be performed, and, if the shift is repeated within the predetermined range, reciprocating rotation can be freely performed. Of course, as for shrinkage after enlargement of the 3-D image as shown in FIG. 31B, by thinning the enlarged image in FIG. 31B, it is possible to shrink the image for restoring to the original image as shown in FIG. 31A.

Figure 32:
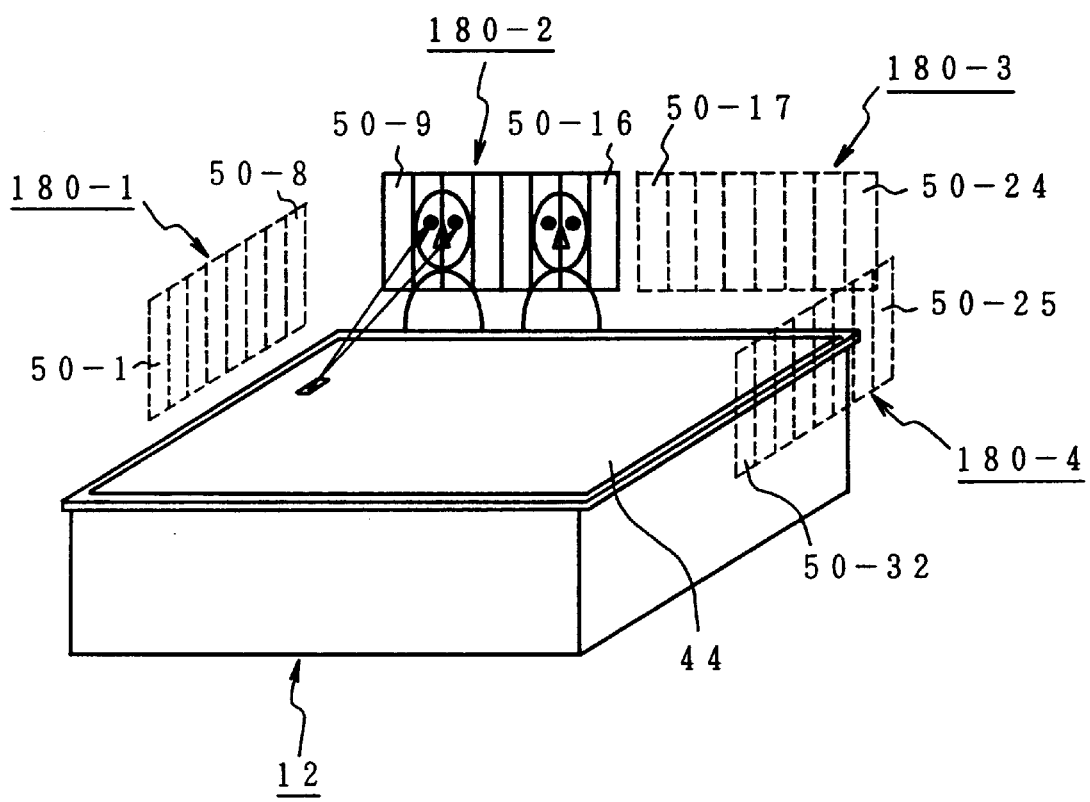
FIG. 32 is an explanatory drawing of projected regions constructed as groups according to the present invention.

ESTABLISHMENT OF PROJECTED REGIONS:

In a 3-D display station according to the present invention, as shown in FIG. 5, the plurality of projected regions can be established around the display 44, and various forms to establish the projected regions can be taken. FIG. 32 shows another embodiment of projected regions in a 3-D display station according to the present invention. This embodiment is characterized in that the projected regions are separately established by grouping the projected regions into projected region groups 180-1 to 180-4, that is, 4 groups around the display 44. Each of the projected region groups 180-1 to 180-4 comprises, for example, 8 projected regions, and hence, the total projected regions are 32 projected regions 50-1 to 50-32. Regarding, in this case, the display projection of parallax images for making the 3-D image recognized, the parallax images are generated that are ones seen from respective points of view in all projected regions 50-1 to 50-32 and are different from each other, and they are displayed and projected to the corresponding projected regions.

Figure 33:
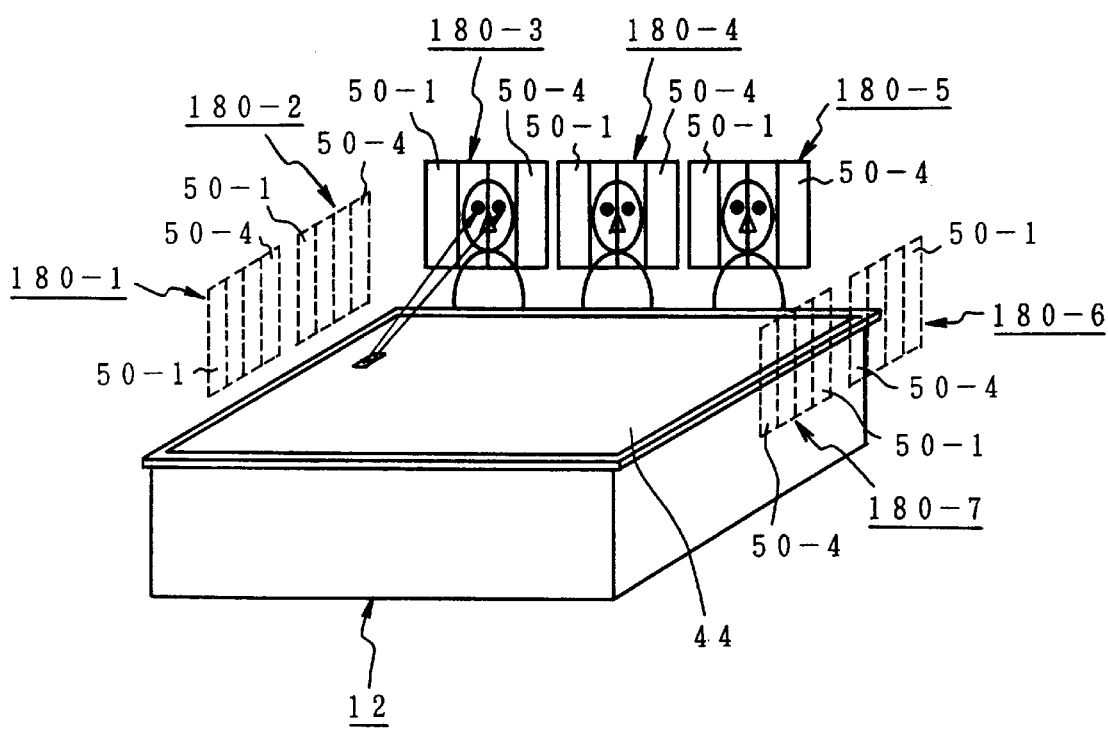
FIG. 33 is an explanatory drawing of other projected regions constructed as groups according to the present invention.

FIG. 33 shows still another embodiment of establishment of projected regions in a 3-D display station according to the present invention. In this embodiment, projected region groups 180-1 to 180-7 further divided around the display 44 are established, and respective projected region groups have the same projected regions 50-1 to 50-4. As parallax images to be displayed on the display 44 and projected, parallax images of an object in a 3-D generation space of the display 44 are generated by establishing positions of points of view in projected regions of a specific projected region group, for example, respective projected regions 50-1 to 50-4 of the projected region group 180-1. Then, these parallax images are commonly displayed and projected to respective projected regions 50-1 to 50-4 of all projected region groups 180-1 to 180-7. For this reason, observers existing in the projected region groups 180-1 to 180-7 can observe the same 3-D image in different positions, and, since 4 projected regions is allocated per observer, the observer can see the object at different positions within the range.

Figure 34:
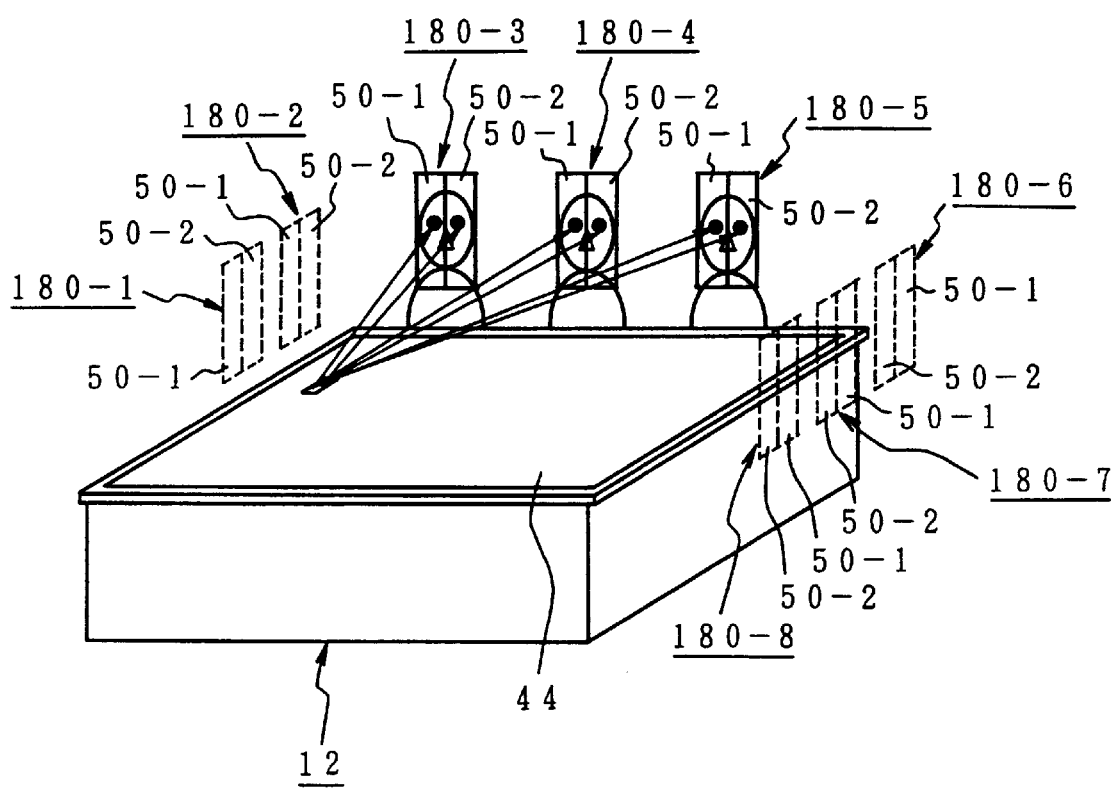
FIG. 34 is an explanatory drawing of projected regions constructed as groups per observer according to the present invention.

FIG. 34 shows a further embodiment of a 3-D display station according to the present invention. This embodiment is characterized in that projected region groups 180-1 to 180-8 for projection of parallax images each of which has a pair of adjacent projected regions 50-1 and 50-2 around the display 44 are separately established. In this case also, the two parallax images that are displayed on the display 44 and projected generate the parallax images in the case of seeing the object by establishing the points of view for the right and left eyes so as to make the center of both eyes correspond to the boundary of projected regions of a specific projected region group, for example, the two projected regions 50-1 and 50-2 of the projected region group 180-1. By displaying and projecting these two parallax images to respective projected regions 50-1 and 50-2 of all projected region groups 180-1 to 180-8, for example, eight observers can observe the same 3-D image.

Figure 35:
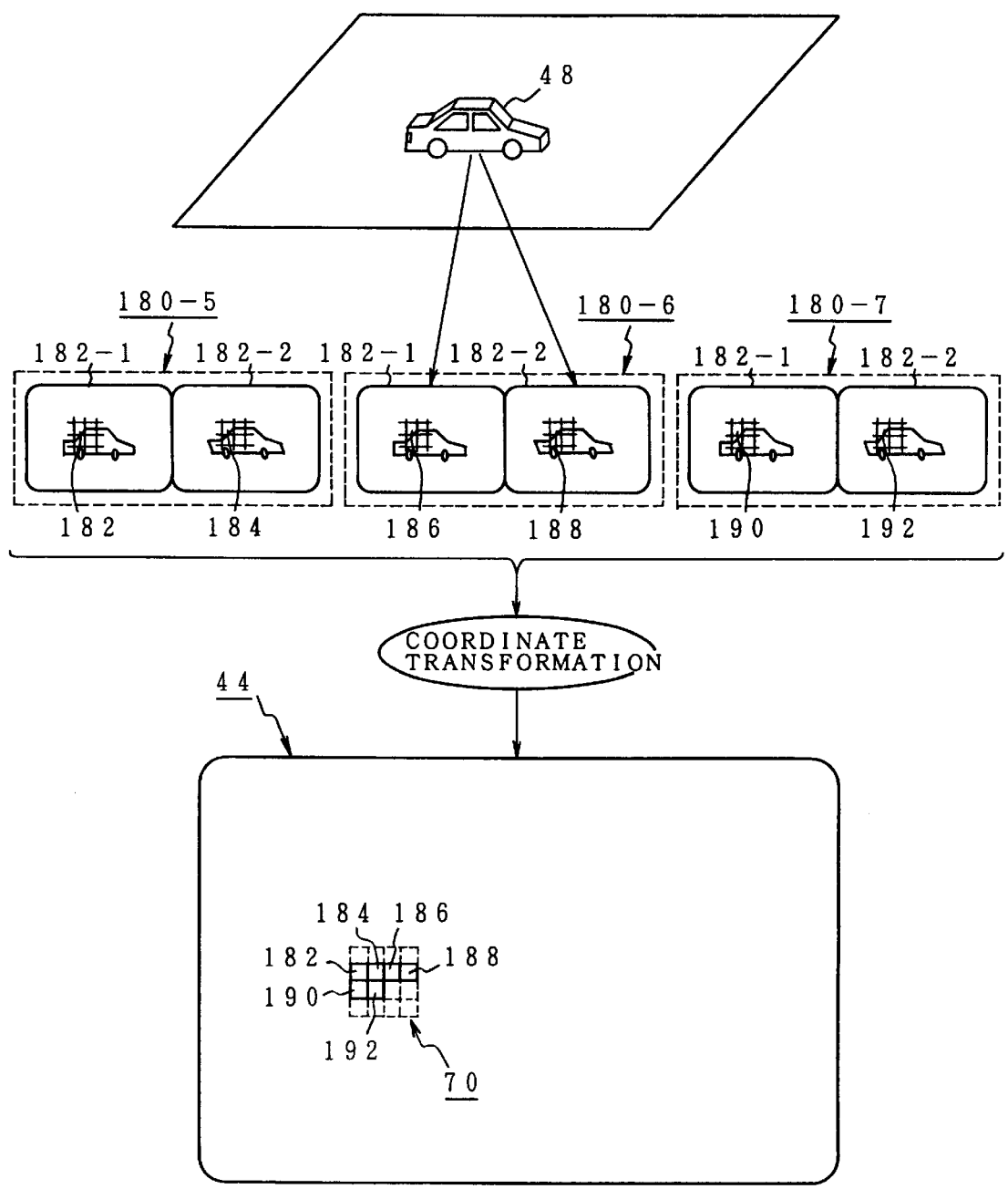
FIG. 35 is an explanatory drawing of generation and mapping of parallax images in FIG. 34.

FIG. 35 shows a procedure from generation of parallax images to writing to the LCD panel 42, regarding one pixel block. First, regarding the object 48, a parallax image for the right eye, 182-1 and a parallax image for the left eye, 182-2 which are parallax images of the object 48 are generated, the object 48 being seeing by establishing the points of view for the right and left eyes so as to make the center of both eyes correspond to the boundary of projected regions of a specific projected region group, for example, the two projected regions 50-1 and 50-2 of the projected region group 180-6. Regarding other projected region groups, for example, adjacent projected region groups 180-5 and 18-7, the parallax image for the right eye, 182-1 and the parallax image for the left eye, 182-2 which are the same as those generated in the case of the projected region group 180-6 are generated as copies as it is. Then, by the coordinate transformation, the pixels are written to and displayed on the LCD panel 42 based on the mapping to the rendering memory. Here, assume that the pixels having the same pixel position in the respective parallax images for the right eyes, 182-1 and the respective parallax images for the left eyes, 182-2 which are generated in response to the projected region groups 180-5 to 180-7 are 182 to 192. Regarding the pixel block 70 corresponding to these pixels in the LCD panel 42, the pixels 182 to 192 are written and displayed in response to the allocated positions in the pixel block as shown in FIG. 35. Consequently, pixels for the right eye, 182, 186, and 190, and pixels for the left eyes, 184, 188, and 192 are alternately written and displayed.

Besides these, if necessary, adequate establishment of projected and displayed regions, and display and projection of parallax images to respective regions can be performed.

Figure 36:
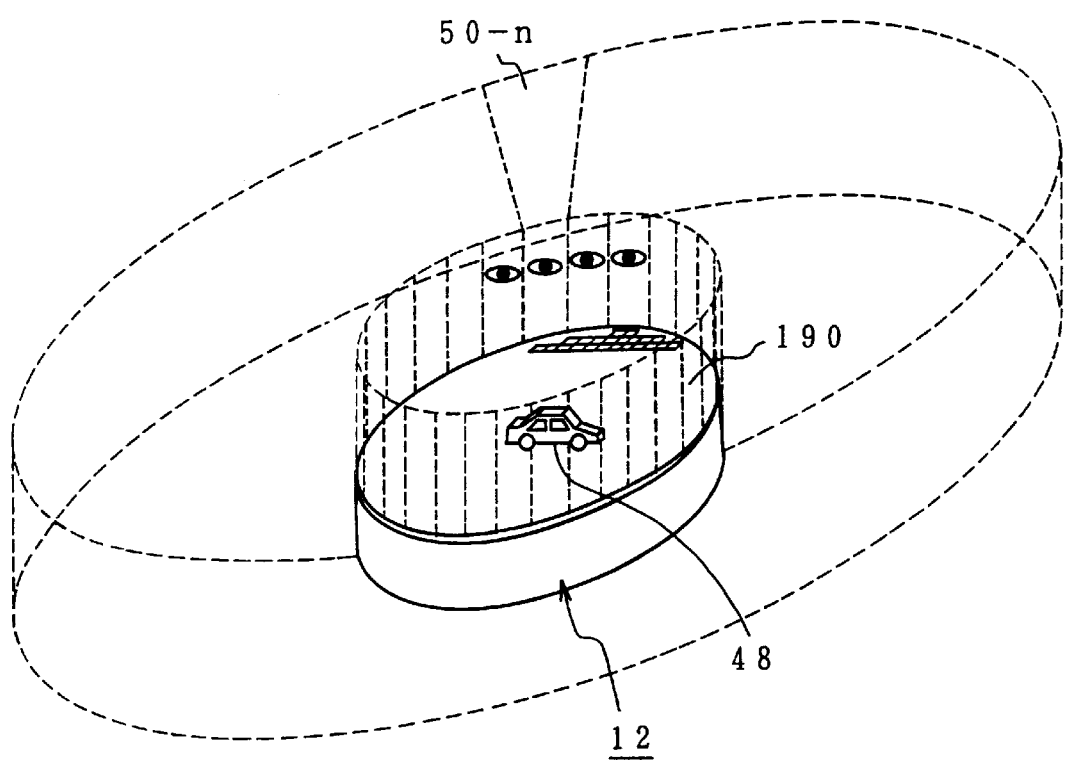
FIG. 36 is an explanatory drawing of an embodied form of the present invention where a display is a circle.

OTHER EMBODIMENTS:

FIG. 36 is a furthermore embodiment of a 3-D display station according to the present invention. This embodiment is characterized in that a display of the parallax image display unit 12 is made to be a round display 190. The panel construction of the round display 190 itself is the same as that in the case of the rectangular display 44 in FIG. 4. As for a 3-D display station using this round display 190, similarly to the case in FIG. 5, a plurality of projected regions are established around the round display 190 as shown by the last projected region 50-n as a representative. By generating parallax images that are those in the case of seeing the object 48 from respective projected regions, mapping them to the rendering memory corresponding to the round display 190, and displaying and projecting them, different parallax images are projected to both sides even if the observers exist at any positions of the round display 190, and hence, the observers can see the 3-D image of the object 48. An advantage of the round display 190 is that observers can observe a 3-D image of the object 48 without distortion at any positions around the display screen. On the other hand, in the rectangular display 44 in FIG. 5, if both eyes of an observer exist in both sides of regions passing through a corner part of the rectangular display 44, parallax images entering into right and left eyes respectively are different in sizes according to the aspect ratio. Therefore, it is impossible to visually recognize the 3-D image by fusion of different parallax images. The round display 190 in FIG. 36 can resolve such distortion in the case of seeing the 3-D image at the corner portion of the rectangular display 44. Of course, the sufficient condition of a round display 190 is to have no corner part, and hence, its shape may be round or ellipse.

Figure 37:
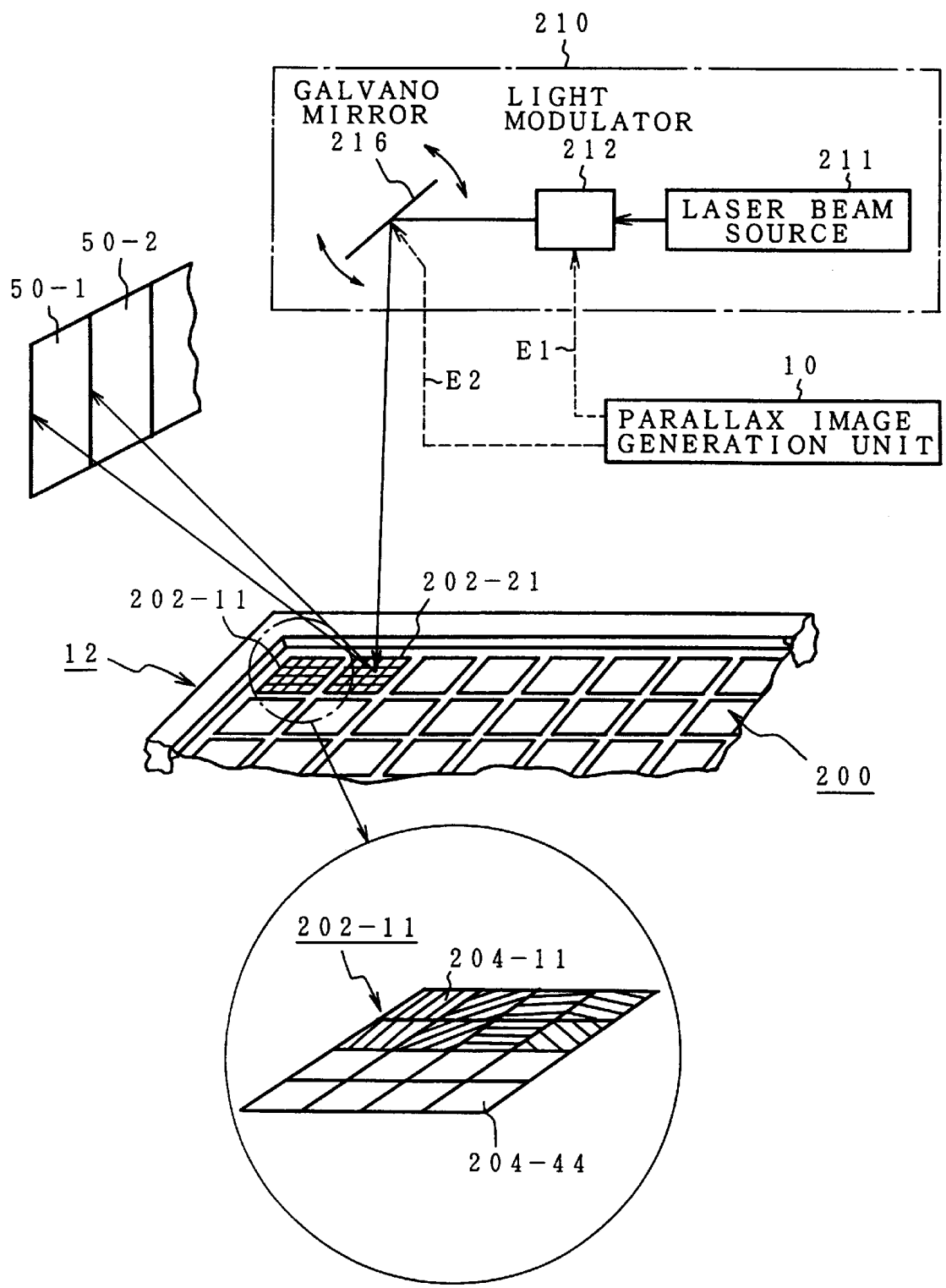
FIG. 37 is an explanatory drawing of another embodied form of the present invention where parallax images are reflected and projected to projected regions in time-sharing by performing beam scanning by mirror segments arrayed on a display.

FIG. 37 is another embodiment of a 3-D display station according to the present invention, and is characterized in that a mirror panel is used as a panel for the parallax image display unit 12, and parallax images are reflected and projected to projected regions by the mirror panel reflecting a laser beam radiated from an upper part. The mirror panel 200 is provided as the display screen of the parallax image display unit 12. The mirror panel 200, similarly to a pixel 82 composed of a liquid-crystal cell in the LCD panel 42 shown in FIG. 8, comprises two-dimensionally arrayed mirror segments corresponding to pixels. Further, similarly to that in FIG. 10, mirror segments corresponding to 4 horizontal pixels by 4 vertical pixels, that is, 16 pixels constitute mirror blocks 202-11, 202-21, . . . . The mirror block 202-11, as shown in an enlarged drawing below the drawing of the mirror panel, comprises 16 mirror segments 204-11 to 204-44 which correspond to projected regions 50-1 to 50-16 and are arrayed in 4 horizontal segments by 4 vertical segments. A projection control unit 210 is provided for the mirror panel 200. The projection control unit 210 comprises a laser beam source 212, a light modulator 214, and a galvano mirror 216 that acts as a projection controller. In the galvano mirror 216, its mirror surface is rotated by a display position signal E2 synchronized with reading of the image data mapped to the rendering memory by the parallax image generator 10, and makes the laser beam scan the mirror segments in the mirror panel 200. In addition, since the parallax image generator 10 gives to the light modulator 214 a display intensity signal E1 that is determined by the pixel data corresponding to the pixel position, the light modulator 214 modulates the light intensity of the laser beam from the laser beam source 212 and the laser beam enters into the galvano mirror 216. Each of mirror segments included in mirror blocks 202-11, 202-21, . . . provided in the mirror panel 200 is arranged so that an optical axis in a reflected direction against an optical axis whose incident point is the reflection point of the galvano mirror 216 may point toward a corresponding projected region in the projected regions 50-1, 50-2, . . . around the predetermined display. Therefore, so long as a beam is entered into the mirror panel 200 with the galvano mirror 216, the reflected light entered from the mirror segment is projected to the corresponding projected region. Since the light is modulated on light intensity with pixel data in the light modulator 214, a corresponding parallax image can be visually recognized with the incident light beam in time-sharing in each projected region. Assuming that the frame period of one parallax image is 1/30 sec, the scanning period of the mirror panel 200 by the galvano mirror 216 may be set to be 1/(30×n) obtained from the frame period divided by the projected region count n. For example, in case of 16 projected and displayed regions, the scanning period may be set to be the frame period of nearly 2.1 msec.

Figure 38:
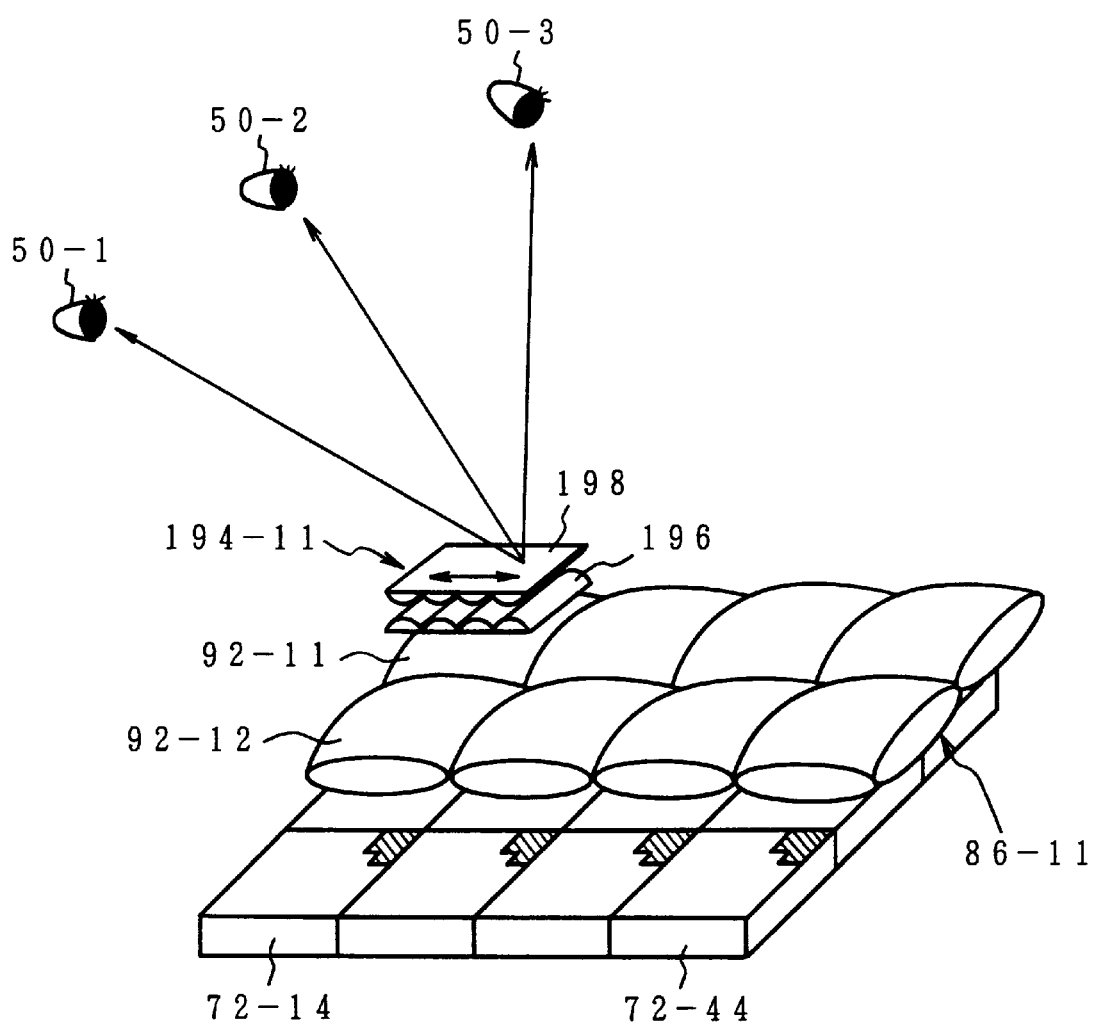
FIG. 38 is an explanatory drawing of still another embodied form of the present invention where a plurality of parallax images are displayed on a display panel in time-sharing and projected to a plurality of projected regions.

FIG. 38 shows still another embodiment of a 3-D display station according to the present invention, and is characterized in that, using an LCD panel having the same pixel count as that of a parallax images, that is, i horizontal pixels by j vertical pixels, a 3-D image is made to be recognized by projecting parallax images in a plurality of projected regions in time-sharing. In FIG. 38, pixels 72-11 to 72-44 arrayed in 4 horizontal pixels by s vertical pixels, that is, 12 pixels are fetched, the pixels which are a part of the LCD panel having the same pixel construction as that of a parallax image, namely, i horizontal pixels by j vertical pixels. As for a lens array thereon, 8 lenses 92-11 to 92-42 are shown. Regarding a lenticular unit further thereon, which functions as a projection controller, only one lenticular unit 194-11 is shown. This lenticular unit 194-11 comprises a fixed lenticular lens 196 and a lenticular lens 198 movable to the directions shown by arrows. By changing the position of the movable lenticular lens 198 to the fixed lenticular lens 196, a projected direction can be controlled so that its projected region may be changed time-sequentially from the projected region 50-1 to 50-2, . . . .

Figure 39:
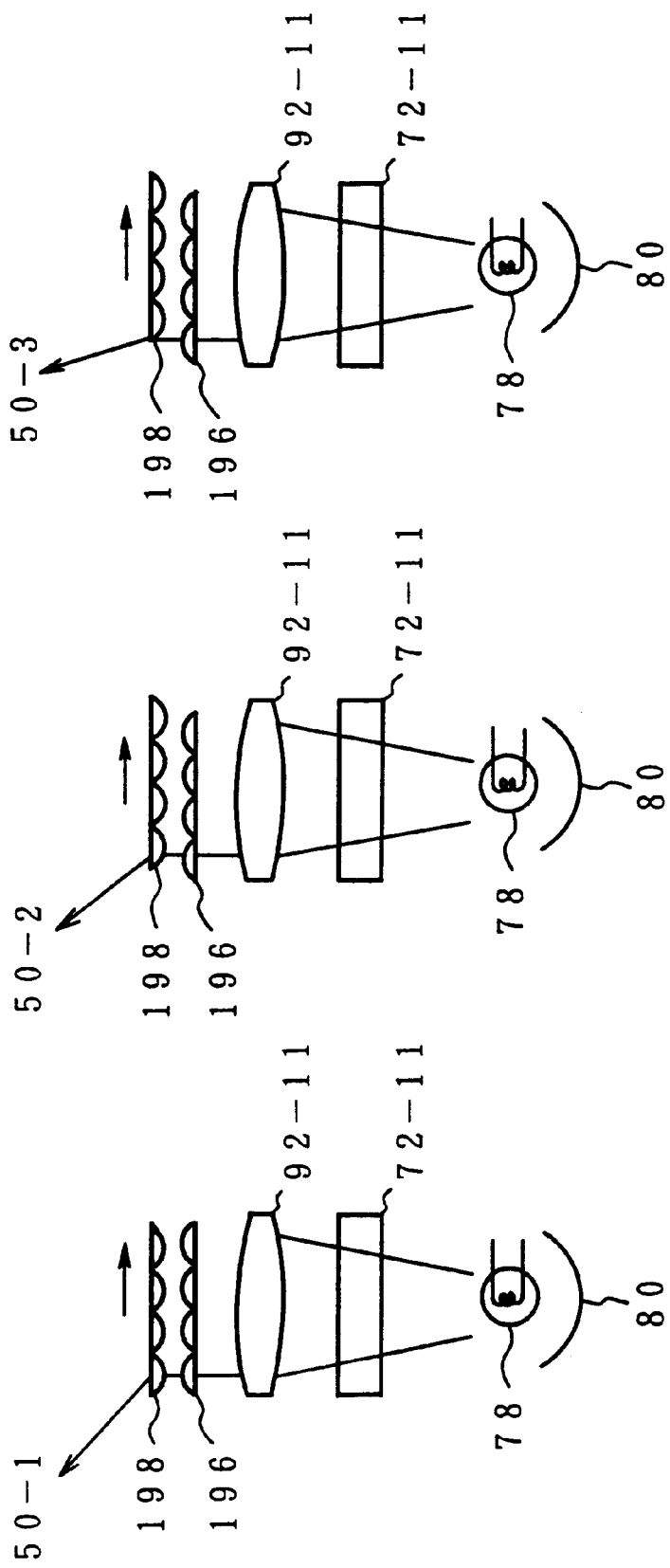
FIGS. 39A to 39C are explanatory drawings of controlling projected directions in FIG. 38.

FIGS. 39A to 39C show control of a projected direction by exemplifying one pixel shown in FIG. 38. FIG. 39A shows the initial position for projecting an image to the projected region 50-1. The light from the light source 78 is reflected by the reflector 80, passes a pixel 82-1 and a lens 92-1, enters from the fixed lenticular lens 196 to the movable lenticular lens 198, and is projected to the projected region 50-1. FIG. 39B shows such a state that the movable lenticular lens 198 is slightly moved toward the right side against the initial position shown in FIG. 39A, and in this state, a projected direction changes toward the projected region 50-2. By further moving the movable lenticular lens 198 toward the right side, the image can be projected to the projected region 50-3 as shown in FIG. 39C.

Figure 40:
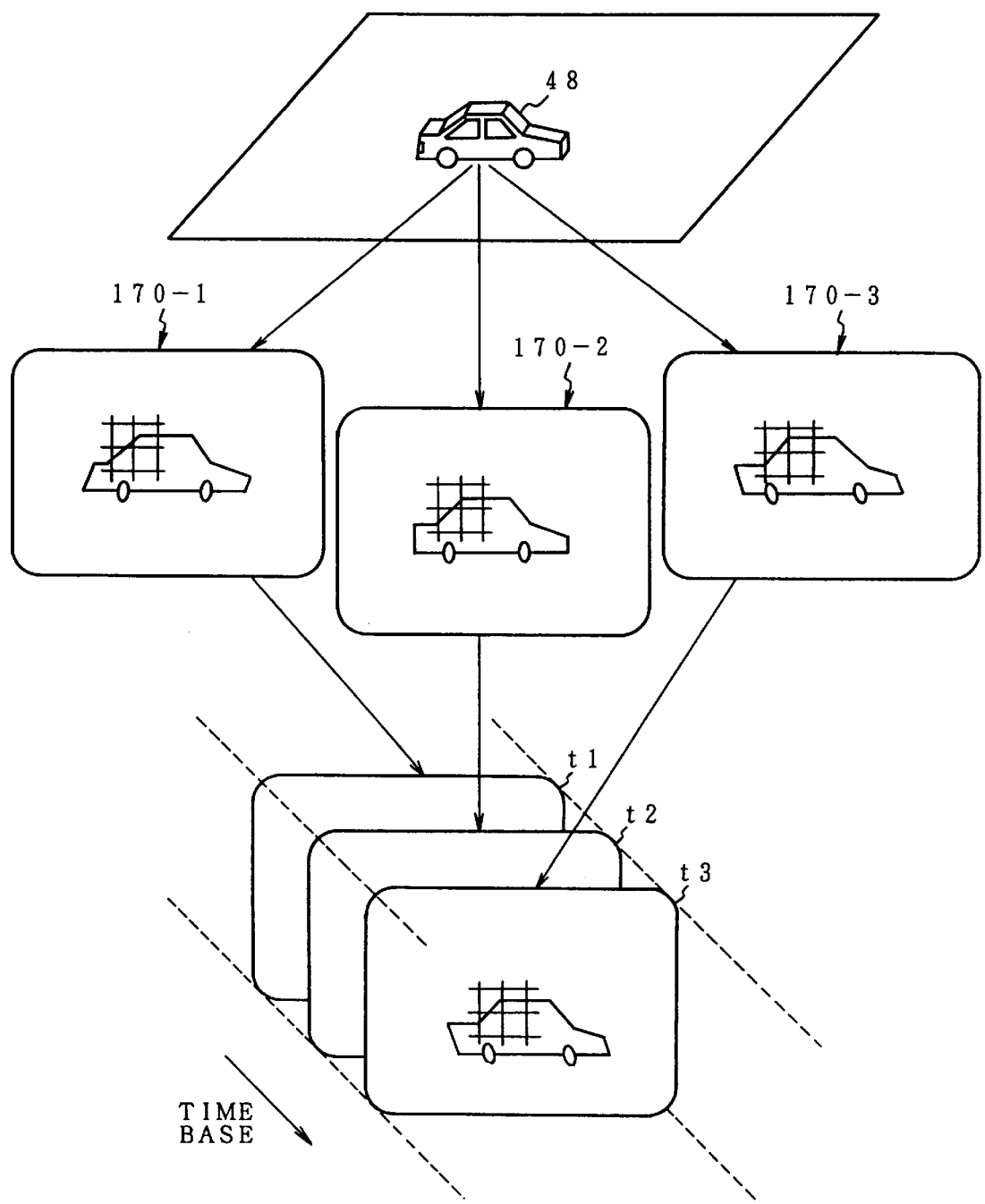
FIG. 40 is an explanatory drawing showing generation of parallax images and storage of them on a time base in FIG. 38.

FIG. 40 is an explanatory drawing showing generation, storage, and reading and displaying of parallax images in a 3-D display station using control of a projected direction by moving the movable lenticular lens 198 in FIG. 38. On the object 48, by establishing positions of points of view in, for example, three projected regions 50-1 to 50-3, parallax images 170-1 to 170-3 are generated. The parallax images 170-1 to 170-3 generated in this manner are arranged sequentially on a time base and displayed. For example, the parallax image 170-1 is saved at the time of t1 on the time base, the parallax image 170-2 is saved at the time of t2 on the time base, and further the parallax image 170-3 is saved at the time of t3 on the time base. In this manner, a plurality of parallax images for a plurality of projected regions that are saved on the time base is sequentially read according to the time base, and are displayed on an LCD panel having the pixel array shown in FIG. 38. At the same time as displaying the parallax images according to the time base, the movable lenticular lens 198 is moved stepwise, and hence, a projected direction is switched in turn.

Figure 41A:
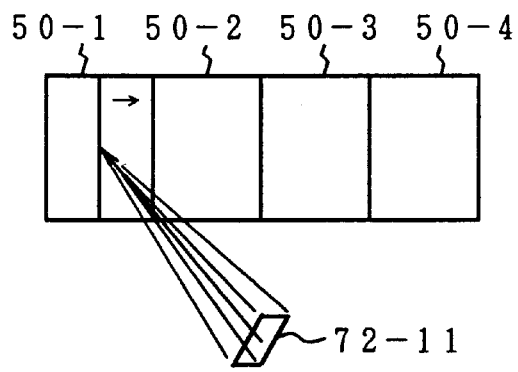
FIGS. 41A to 41D are explanatory drawings of controlling projected directions for a pixel in FIG. 38.

FIGS. 41A to 41D shows switching processing of a projected direction by control of the moving direction of a movable lenticular lens from a pixel, by separating the processing according to progress on a time base. When the parallax image 170-1 arranged at the time of t1 on the time base shown in FIG. 40 is displayed, first, the light passing through the pixel 72-11, as shown in FIG. 41A, is projected to the projected region 50-1 at the time t of t1. Here, the projected region count n is four, and hence, a frame period per parallax image is 1/120 sec, the quotient of one frame period, 1/30 sec, divided by the parallax image count n. For this reason, the frame period ΔT is:

ΔT=(frame period)/(parallax image count).

Figure 41B:
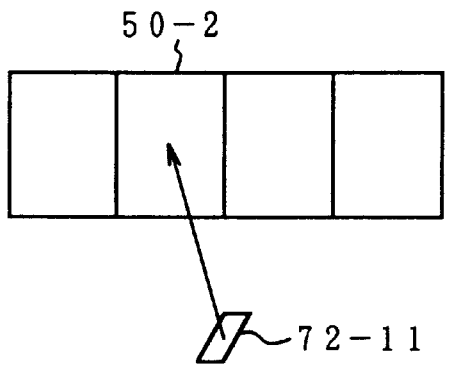
Figure 41C:
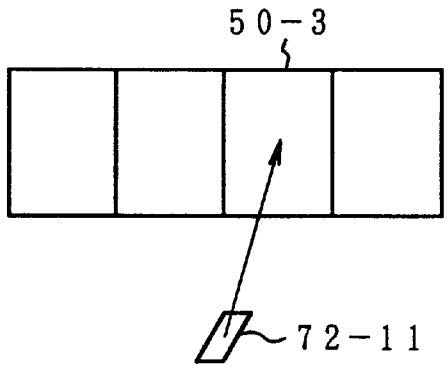
Figure 41D:
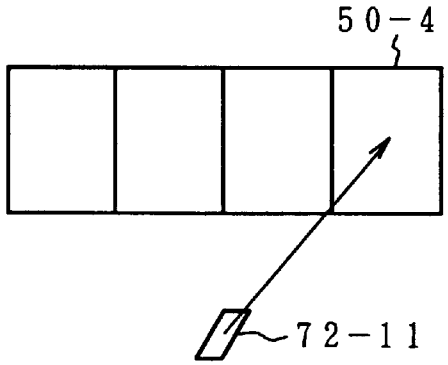

In FIG. 41A, at the time when the frame period per parallax image, ΔT passes and the time reaches t2 (=t1+ΔT), the image, as shown in FIG. 41B, is projected to the projected region 50-2 by continuously driving the movable lenticular lens 198. At the time when the period ΔT further passes and the time reaches t3 (=t1+2ΔT) shown in FIG. 41C, the parallax image is switched and the light from the pixel 72-11 is projected to the projected region 50-3. At the time when the period ΔT still further passes and the time reaches t4 (=t1+3ΔT) shown in FIG. 41D, the parallax image is switched and the light from the pixel 72-11 is projected to the final projected region 50-4. When a series of projection of parallax images is completed, parallax images are projected as the movable lenticular lens is returned stepwise, or the movable lenticular lens is returned to the original position directly, and a series of parallax images of the next frame are projected. According to time-sharing switching of projected directions by such driving of the movable lenticular lens, it is not necessary to use an LCD panel having multiple pixels like (i×j×n) pixels, the product of the pixel count of a parallax image, i horizontal pixels×j vertical pixels, by the projected region count n. Therefore, using an LCD panel having (i×j) pixels, parallax pixels can be projected to and displayed on a plurality of projected regions in time-sharing. Owing to this, it is possible to use a TFT LCD panel, which has few pixels, as an LCD panel. Since the TFT LCD panel is capable of high-speed displaying, it is possible in this embodiment to realize motion display of a 3-D image.

As described above, according to the present invention, multiple projected regions for parallax images are established around a display in a display unit, an observer can recognize a 3-D image at any positions by seeing at a position oblique to the display screen two images, having different parallaxes and being projected to adjacent projected regions, with the right and left eyes. For this reason, many persons can observe the same 3-D image, and even one person can perform three-dimensional observation of "what it is" by moving to different positions. Therefore, the present invention can be effectively applied to observation of 3-D images in wide fields such as teleconference systems, CAD information in design fields, transportation control of airplanes and the like, and simulators for experiments.

In addition, the present invention is not limited by numbers shown in above-described embodied forms. Furthermore, in the above-described embodied forms, the case that a display screen is horizontally arranged is exemplified, but it is apparent that arrangement of the display screen except it may be performed if necessary.

What is claimed is:

1. A three-dimensional display station for three-dimensional image display, said three-dimensional display station comprising:

a parallax image generator for generating a plurality of parallax images each to be projected to a corresponding one of a plurality of projected regions around a horizontally-installed display in predetermined intervals, the projected regions being disposed circumferentially around the display and extending radially from a perimeter thereof, each projected region having a width such that when either one of the right and left eyes of a viewer is located in the region, the other eye is located outside the region, each two of the parallax images corresponding to adjacent ones of the projected regions having a predetermined parallax therebetween for being seen from respective points of view in the adjacent projected regions, the parallax images each comprising an array of pixels corresponding to respective reference positions in a predetermined pixel array pattern, for each reference position, said parallax image generator gathering together pixels of the plurality of parallax images corresponding to the reference position into an image pixel block, and said parallax image generator mapping the pixels to a rendering memory corresponding to the display in accordance with the image pixel blocks; and a parallax image display unit for displaying the plurality of mapped parallax images from the rendering memory on the display by projecting light from each pixel of each image pixel block toward a projected region corresponding to the parallax image comprising the projected pixel, thereby displaying a three-dimensional image observable by positioning both eyes of an observer in respective adjacent ones of the projected regions to receive the respective parallax images projected thereto.

2. The three-dimensional display station according to claim 1, wherein each interval of the projected regions is set to be not more than a space between human eyes.

3. The three-dimensional display station according to claim 1, wherein said parallax image generator generates the parallax images to form an object image existing in an internal space formed by regarding points of view established in the projected regions as vertexes and regarding the display as a base.

4. The three-dimensional display station according to claim 1, wherein said parallax image generator projects to the display each of sample points on an object image being seen from points of view in the projected regions, and generates the parallax images as sets of the projected points.

5. The three-dimensional display station according to claim 4, wherein said parallax image generator adds attenuated values of light between sample points and projected points to an intensity of the object image at the sample points as pixel data of the projected points, and generates the intensity as pixel data of the parallax images.

6. The three-dimensional display station according to claim 4, wherein pixel data of the projected points is defined as textured values at sample points on the object image.

7. The three-dimensional display station according to claim 1, wherein:

the plurality of projected regions circumferentially encloses the display; and said parallax image display unit projects the parallax images to be successively varying around the entire perimeter of the display.

8. The three-dimensional display station according to claim 1, wherein:

the plurality of projected regions is divided into a plurality of groups disposed circumferentially around the display;

said parallax image generator generates the plurality of parallax images each to be seen from a point of view in a corresponding projected region in each group; and said parallax image display unit projects light from pixels of each of the parallax images toward the corresponding projected region in each of the groups.

9. The three-dimensional display station according to claim 1, wherein:

the plurality of projected regions is divided into a plurality of pairs around the display, and the plurality of parallax images comprises a pair of parallax images each to be seen from a point of view in a corresponding one of each pair of projected regions; and said parallax image display unit projects the same pair of parallax images to each of the pairs of projected regions around the display.

10. The three-dimensional display station according to claim 1, wherein, by changing a number of the image pixel blocks mapped from the parallax images to the rendering memory, said parallax image generator enlarges the displayed three-dimensional image or shrinks the displayed three-dimensional image.

11. The three-dimensional display station according to claim 1, wherein said parallax image generator rotates a displayed three-dimensional image by sequentially shifting a position of each pixel of the plurality of parallax images in each pixel block in said rendering memory through an arrayed sequence of pixel positions corresponding to a sequence of successive ones of the projected regions.

12. The three-dimensional display station according to claim 1, wherein said parallax image generator combines into a pair two pixels corresponding to different projected regions in each image pixel block in the rendering memory, maps a pixel of a first parallax image generated for a projected region to a pixel of each pair, maps a pixel of another parallax image generated for another projected region to another pixel of each pair, and thereby enables observers to observe a same view of the displayed three-dimensional image in each of plural pairs of the projected regions.

13. The three-dimensional display station according to claim 1, wherein:

said parallax image generator obtains for each parallax image a pixel address (I, J) in the rendering memory for a pixel address (i, j) in the parallax image by performing coordinate transformation using the formulas $$I = s + S(i-1)$$

and $$J = t + T(j-1),$$

where (i, j) is an address of a pixel in the parallax image, (s, t) is an address of a pixel in an image pixel block of the parallax image pixel, S is a horizontal pixel count ($1 \leq s \leq S$), T is a vertical pixel count ($1 \leq t \leq T$), and (I, J) is an address of a pixel in the rendering memory; and said parallax image generator maps pixel data according to the pixel addresses (I,J).

14. The three-dimensional display station according to claim 13, wherein:

with n being a count of the projected regions disposed around the display, and (M×N) being a pixel count of each parallax image, given by multiplication of a horizontal pixel count M by a vertical pixel count N, a pixel count of said rendering memory is (M×N×n); and with (S×T) being a pixel count of each image pixel block, given by multiplication of a horizontal pixel count S by a vertical connection count T, the pixel count (S×T) is equal to the projected region count n.

15. The three-dimensional display station according to claim 1, wherein said parallax image generator generates the parallax images by performing geometrical calculation from information on a three-dimensional object.

16. The three-dimensional display station according to claim 1, wherein said parallax image generator generates the parallax images from images obtained by shooting an object with an image pickup equipment.

17. The three-dimensional display station according to claim 1, wherein said parallax image display unit comprises:

a display panel comprising an array of display pixel blocks for displaying mapped images from the rendering memory; and a projection panel for projecting light from respective pixels of each display pixel block toward corresponding projected regions to display each parallax image, thereby displaying the plurality of parallax images by display of the image display blocks on the display panel.

18. The three-dimensional display station according to claim 1, wherein said parallax image display unit has the display panel and the projection panel horizontally installed therein, and projects in a projection range extending from parallel to a surface of the display panel, at 0°, to normal to the display panel, at 90°.

19. The three-dimensional display station according to claim 1, wherein a display screen of said parallax image display unit has a rectangular plane shape.

20. The three-dimensional display station according to claim 1, wherein a display screen of said parallax image display unit has a plane shape forming one of a circle and an ellipse.

21. The three-dimensional display station according to claim 17, wherein the projection panel comprises:

a lens array having a corresponding lens for each display pixel of the display panel, each of the lenses being aligned with the display pixel to which the lens corresponds; and a deflecting array having a refracting element or a diffraction element for deflecting incident light from each lens of the lens array toward a corresponding projected region.

22. The three-dimensional display station according to claim 1, wherein said parallax image display unit comprises:

a mirror panel having a plurality of mirror segments respectively corresponding to the pixels of a mapped parallax image in the rendering memory, the mirror segments being located on the display and grouped into mirror blocks corresponding to the image pixel blocks, the mirror segments being oriented to reflect incident light from predetermined incident points to corresponding projected regions disposed around the display;

a direction controller for scanning the incident light to the mirror segments of the mirror panel in a predetermined order and reflecting the light toward projected regions determined according to arrangement of each mirror segment; and a light modulator for changing an intensity of light entering into the direction controller according to pixel data in the rendering memory.

23. A three-dimensional display station for three-dimensional image display, said three-dimensional display station comprising:

a parallax image generator for generating a plurality of parallax images each to be projected to a corresponding one of a plurality of projected regions each having a width such that when either one of the right and left eyes of a viewer is located in the projected region, the other eye is outside the projected region, the projected regions being disposed circumferentially in predetermined intervals around a horizontally installed display screen and extending radially from a perimeter thereof, the parallax images corresponding to adjacent projected regions having a predetermined parallax therebetween for being seen from respective points of view in the adjacent projected regions, said parallax image generator mapping the plurality of parallax images on a plurality of rendering memories according to a time base; and a parallax image display unit for displaying the plurality of mapped parallax images from the plurality of rendering memories, at constant periods on a display screen according to an order thereof on the time base, by controlling a projected direction so that light from each pixel is projected toward each of the plurality of projected regions in succession for successive image display, thereby displaying a three-dimensional image observable by positioning an observer with both eyes in respective adjacent projected regions to receive the parallax images successively projected thereto in time-sharing.

24. The three-dimensional display station according to claim 23, wherein said parallax image display unit comprises:

a display panel, comprising the display screen and a lens array having a lens aligned with each display pixel of the display screen, for displaying thereon the parallax images saved in the rendering memories at constant periods in time-sharing; and a direction control array for receiving light from each lens of the lens array each time a parallax image is displayed on the display panel in time-sharing, and successively directing the light to a plurality of projected regions in time-sharing.

25. A three-dimensional display method for three-dimensional image display, the three-dimensional display method comprising:

a parallax image generation process including
generating a plurality of parallax images each to be projected to a corresponding one of a plurality of projected regions each having a width such that when either one of the right and left eyes of a viewer is located in the projected region, the other eye is outside the projected region, the projected regions being disposed circumferentially around a horizontally installed display screen in predetermined intervals and extending radially from a perimeter thereof, the parallax images corresponding to adjacent projected regions having having a predetermined parallax therebetween for being seen from respective points of view in the adjacent projected regions,
the parallax images each comprising an array of pixels corresponding to respective reference positions in a predetermined pixel array pattern, for each reference position, combining pixels corresponding to the reference position from the plurality of parallax images into an image pixel block, and mapping the pixels on memory corresponding to the display screen according to the combinations of the pixels into the image pixel blocks; and a parallax image display process for displaying the plurality of mapped parallax images from the memory on the display by projecting light from each pixel of each image pixel block toward a projected region corresponding to the parallax image comprising the projected pixel, thereby displaying a three-dimensional image observable by positioning both eyes of an observer in respective adjacent ones of the projected regions to receive the respective parallax images projected thereto.

26. A three-dimensional display method for making a three-dimensional image observed by projecting parallax images to both eyes, the three-dimensional display method comprising:

a parallax image generation process including generating a plurality of parallax images each to be projected to a corresponding one of a plurality of projected regions each having a width such that when either one of the right and left eyes of a viewer is located in the projected region, the other eye is outside the projected region, the projected regions being disposed circumferentially around a horizontally installed display in predetermined intervals and extending radially from a perimeter thereof, each two parallax images that correspond to adjacent ones of the projected regions having a predetermined parallax therebetween for being seen from respective points of view in the adjacent projected regions, and mapping the plurality of parallas on rendering memory according to an order of the parallax images on a time base; and a parallax image display process for displaying the plurality of parallax images from the rendering memory on the display, at constant intervals according to the order thereof on the time base, by controlling projected directions so that light from each pixel is projected toward each of the plurality of projected regions in succession for each successive image display, thereby displaying a three-dimensional image observable by positioning both eyes of in respective adjacent projected regions to receive the parallax images successively projected thereto in time-sharing.

* * * * *